US 12,147,045 B2

(12) United States Patent
Sato et al.

(10) Patent No.: US 12,147,045 B2
(45) Date of Patent: Nov. 19, 2024

(54) LIGHT GUIDE ELEMENT AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 205 days.

(21) Appl. No.: 17/848,574

(22) Filed: Jun. 24, 2022

(65) Prior Publication Data

US 2022/0326531 A1    Oct. 13, 2022

Related U.S. Application Data

(63) Continuation of application No. PCT/JP2020/047505, filed on Dec. 18, 2020.

(30) Foreign Application Priority Data

Dec. 27, 2019  (JP) .................. 2019-239151

(51) Int. Cl.
    *G02B 27/01*    (2006.01)
    *F21V 8/00*    (2006.01)

(52) U.S. Cl.
    CPC ....... *G02B 27/0172* (2013.01); *G02B 6/0016* (2013.01); *G02B 6/0035* (2013.01);
    (Continued)

(58) Field of Classification Search
    CPC .............. G02B 27/0172; G02B 6/0016; G02B 6/0035; G02B 6/0056
    (Continued)

(56) References Cited

U.S. PATENT DOCUMENTS

2002/0067458 A1    6/2002    Ohtake et al.
2011/0026128 A1    2/2011    Baker et al.
(Continued)

FOREIGN PATENT DOCUMENTS

CN    107966820 A    4/2018
JP    2002-169021 A    6/2002
(Continued)

OTHER PUBLICATIONS

International Preliminary Report on Patentability and Written Opinion of the International Searching Authority for International Application No. PCT/JP2020/047505, dated Jul. 7, 2022, with an English translation.
(Continued)

*Primary Examiner* — Jerry M Blevins
(74) *Attorney, Agent, or Firm* — Birch, Stewart, Kolasch & Birch, LLP

(57) ABSTRACT

Provided are: a light guide element in which deterioration in image sharpness can be prevented and the entire area of a display image can be suitably observed irrespective of the visual line of a user, the position of eyes of the user, and the like; and an image display apparatus including the light guide element. The light guide element includes: a light guide plate that includes a first light guide layer and a second light guide layer; and an incidence diffraction element and an emission diffraction element that are laminated on the second light guide layer, in which in a case where a refractive index of the first light guide layer is represented by n1 and a refractive index of the second light guide layer is represented by n2 in the light guide plate, n1<n2 is satisfied.

20 Claims, 11 Drawing Sheets

Figure 1:
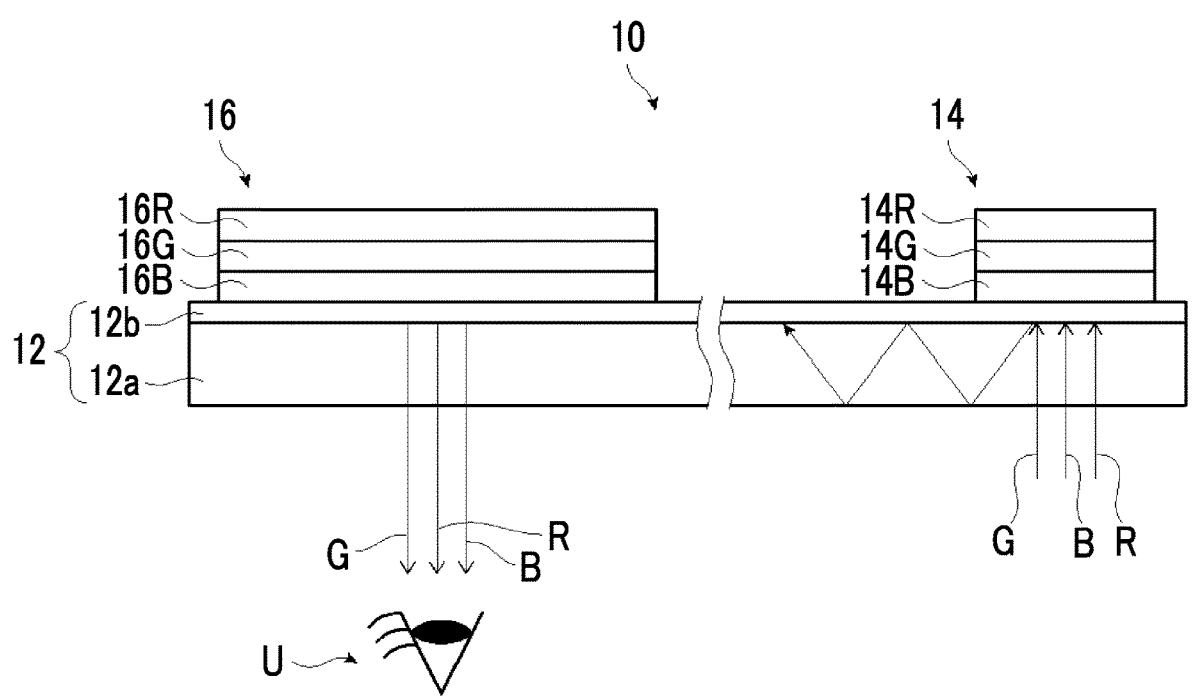

(52) U.S. Cl.
CPC .... *G02B 6/0056* (2013.01); *G02B 2027/0112* (2013.01); *G02B 2027/0178* (2013.01)

(58) Field of Classification Search
USPC .......................................................... 385/37
See application file for complete search history.

(56) References Cited

U.S. PATENT DOCUMENTS

| | | |
|---|---|---|
| 2016/0349517 A1 | 12/2016 | Miyasaka et al. |
| 2018/0113309 A1 | 4/2018 | Robbins et al. |
| 2019/0121126 A1* | 4/2019 | Simmonds ......... G02B 27/0081 |
| 2019/0187472 A1 | 6/2019 | Choi et al. |
| 2020/0150430 A1* | 5/2020 | Minemura ......... G02B 27/0101 |
| 2021/0011295 A1 | 1/2021 | Sato et al. |

FOREIGN PATENT DOCUMENTS

| | | |
|---|---|---|
| JP | 2003-202558 A | 7/2003 |
| JP | 2011-248328 A | 12/2011 |
| JP | 2015-105990 A | 6/2015 |
| JP | 2018-510377 A | 4/2018 |
| JP | 2019-3011 A | 1/2019 |
| WO | WO 2015/125794 A1 | 8/2015 |
| WO | WO2019/189852 A1 | 10/2019 |
| WO | WO 2021/080734 A1 | 4/2021 |

OTHER PUBLICATIONS

International Search Report for International Application No. PCT/JP2020/047505, dated Mar. 9, 2021, with an English translation.
Kress et al., "Towards the Ultimate Mixed Reality Experience: HoloLens Display Architecture Choices," SID 2017 Digest, 2017, pp. 127-131.
Chinese Office Action and Search Report dated Sep. 27, 2023 for Application No. 202080090555.3 with an English translation.
Japanese Notice of Reasons for Refusal for Japanese Application No. 2021-567409, dated Jan. 9, 2024, with an English translation.
Japanese Office Action dated Jul. 4, 2023 for Application No. 2021-567409 with an English translation.

* cited by examiner

LIGHT GUIDE ELEMENT AND IMAGE DISPLAY APPARATUS

CROSS-REFERENCE TO RELATED APPLICATIONS

This application is a Continuation of PCT International Application No. PCT/JP2020/047505 filed on Dec. 18, 2020, which claims priority under 35 U.S.C. § 119(a) to Japanese Patent Application No. 2019-239151 filed on Dec. 27, 2019. The above application is hereby expressly incorporated by reference, in its entirety, into the present application.

BACKGROUND OF THE INVENTION

1. Field of the Invention

The present invention relates to a light guide element where light is incident, propagates, and is emitted, and an image display apparatus that includes the light guide element.

2. Description of the Related Art

Recently, as described in Bernard C. Kress et al., Towards the Ultimate Mixed Reality Experience: HoloLens Display Architecture Choices. SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices. SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light propagates in the light guide plate. The light propagated in the light guide plate is also diffracted by the diffraction element in the other end part of the light guide plate and is emitted from the light guide plate to an observation position by the user.

SUMMARY OF THE INVENTION

As disclosed in Bernard C. Kress et al., Towards the Ultimate Mixed Reality Experience: HoloLens Display Architecture Choices, SID 2017 DIGEST, pp. 127-131, in AR glasses, an image displayed by a display is incident into a diffraction element on an incidence side and is diffracted. As a result, the image (projection light) is incident into a light guide plate, propagates in the light guide plate, and is emitted to a diffraction element on an emission side. The diffraction element on the emission side diffracts the propagated image and is emitted from the light guide plate to an observation position by a user.

However, according to an investigation by the present inventors, it was found that, in an image display apparatus in the related art including a light guide plate, for example, in AR glasses, in a case where a user moves the visual line or moves the position of eyes, the image cannot be partially seen, that is, so-called deterioration in image sharpness occur, and there may be a case where an appropriate image cannot be observed.

An object of the present invention is to solve the above-described problem of the related art and to provide: a light guide element in which deterioration in image sharpness can be prevented and the entire area of a display image can be suitably observed irrespective of the visual line of a user, the position of eyes of the user, and the like in an image display apparatus including a light guide plate, for example, in AR glasses; and an image display apparatus including the light guide element.

In order to achieve the object, the present invention has the following configurations.

[1] A light guide element comprising:
a light guide plate that includes a first light guide layer and a second light guide layer; and
an incidence diffraction element that is laminated on the second light guide layer of the light guide plate and an emission diffraction element that is laminated on the second light guide layer of the light guide plate,
in which in a case where a refractive index of the first light guide layer is represented by n1 and a refractive index of the second light guide layer is represented by n2 in the light guide plate,
n1<n2 is satisfied.

[2] The light guide element according to [1],
in which in a case where a thickness of the first light guide layer is represented by d1 and a thickness of the second light guide layer is represented by d2 in the light guide plate,
d1≥d2 is satisfied.

[3] The light guide element according to [1] or [2],
in which a refractive index n1 of the first light guide layer and a refractive index n2 of the second light guide layer satisfy n2−n1>0.1.

[4] The light guide element according to any one of [1] to [3],
in which a thickness d1 of the first light guide layer and a thickness d2 of the second light guide layer satisfy d2/d1<0.7.

[5] The light guide element according to any one of [1] to [4],
in which in a case where a refractive index of the incidence diffraction element and the emission diffraction element is represented by nD, a refractive index n1 of the first light guide layer and the refractive index nD satisfy n1<nD.

[6] The light guide element according to any one of [1] to [5],
in which at least one of the incidence diffraction element or the emission diffraction element is any one of a surface relief diffraction element, a volume hologram diffraction element, or a polarization diffraction element.

[7] The light guide element according to [6],
in which the polarization diffraction element includes a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

[8] The light guide element according to [7],
in which the liquid crystal diffraction layer has a region in which the direction of the optical axis of the liquid crystal compound is helically twisted and rotates in a thickness direction.

[9] The light guide element according to [8],
wherein the liquid crystal diffraction layer includes a cholesteric liquid crystal layer obtained by immobilizing a cholesteric liquid crystalline phase.

[10] The light guide element according to any one of [1] to [9],
in which in at least one of the incidence diffraction element or the emission diffraction element, a period of a diffraction structure is 0.1 to 10 μm.

[11] The light guide element according to any one of [1] to [10],
in which an intermediate diffraction element is provided between the incidence diffraction element and the emission diffraction element on a light propagation path of the light guide plate.

[12] An image display apparatus comprising:
the light guide element according to any one of [1] to [11]; and
a display element that emits an image to the incidence diffraction element.

According to an aspect of the present invention, for example, in an image display apparatus including a light guide plate, for example, in AR glasses, irrespective of the visual line of a user, the position of eyes of the user, and the like, partial deterioration in image sharpness can be suppressed, and the entire image can be appropriately observed.

BRIEF DESCRIPTION OF TIE DRAWINGS

Figure 2:
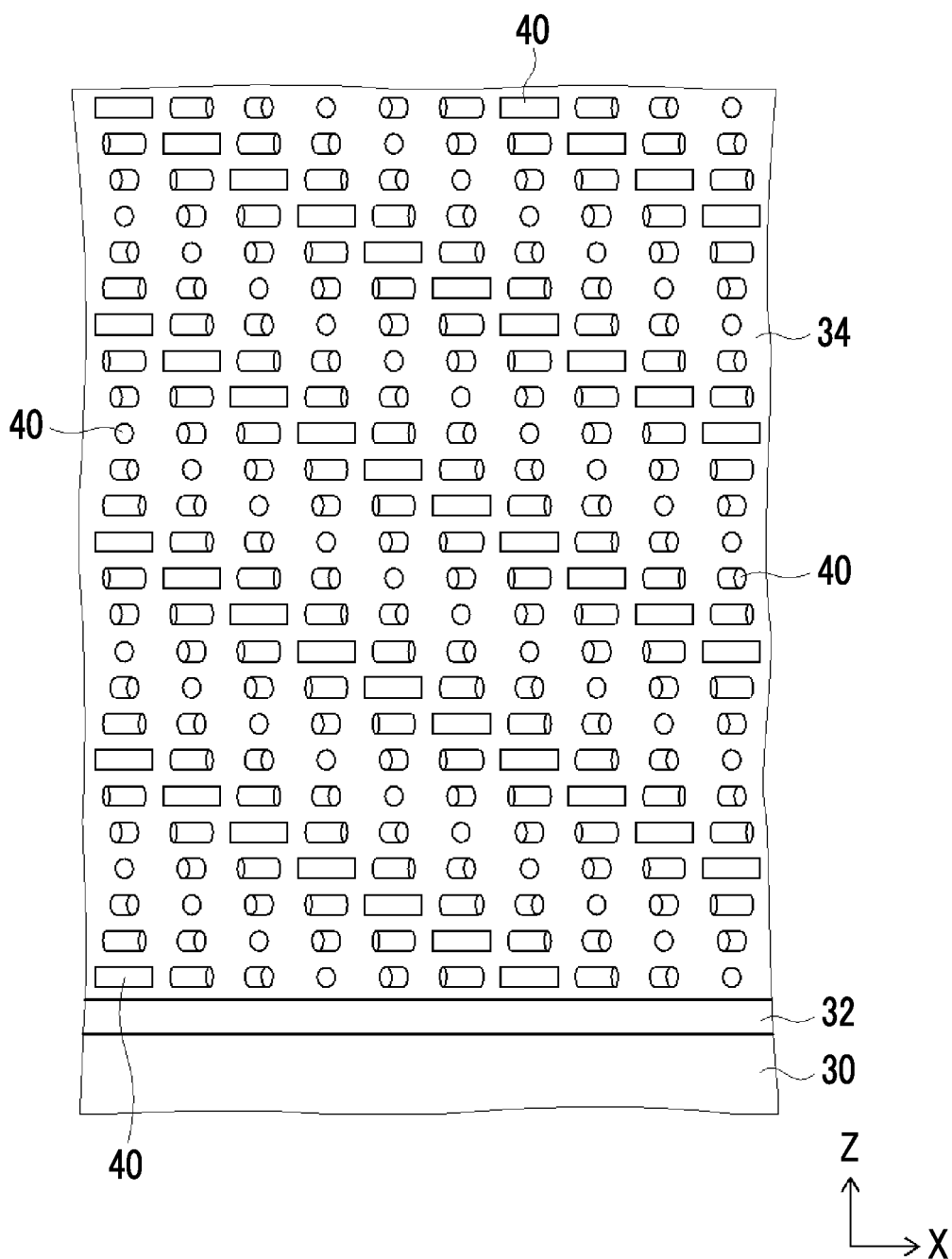
Figure 3:
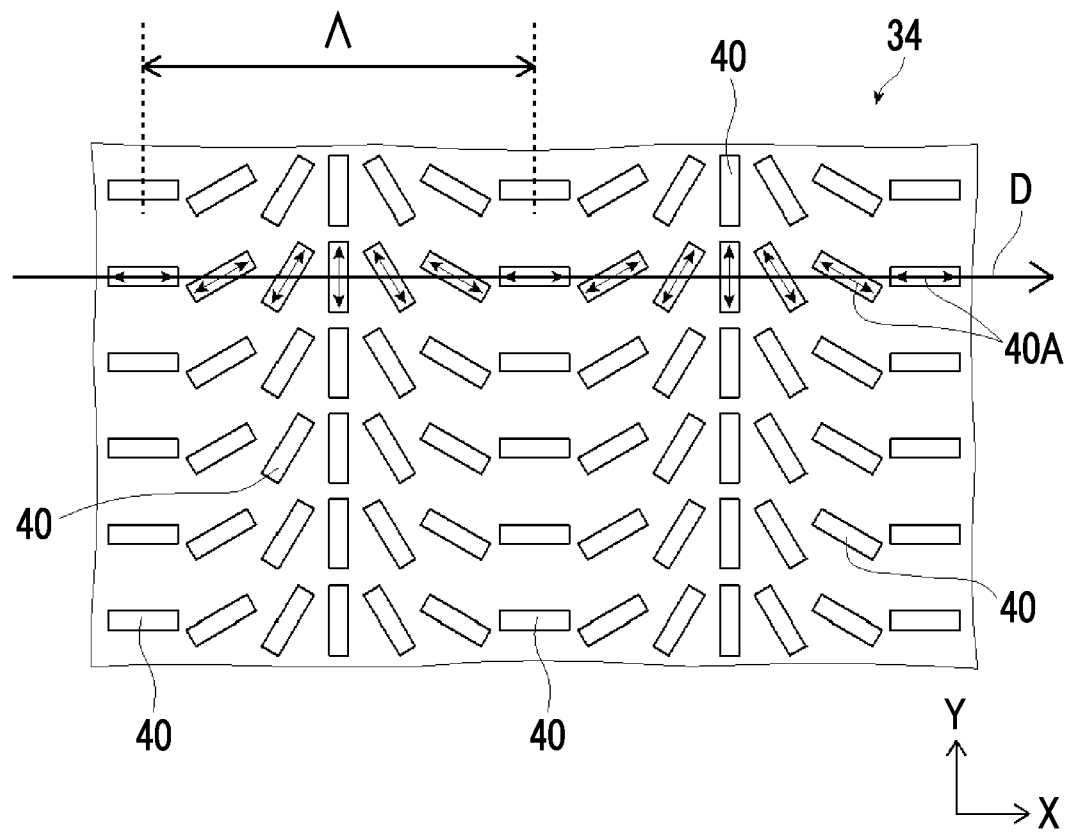
Figure 4:
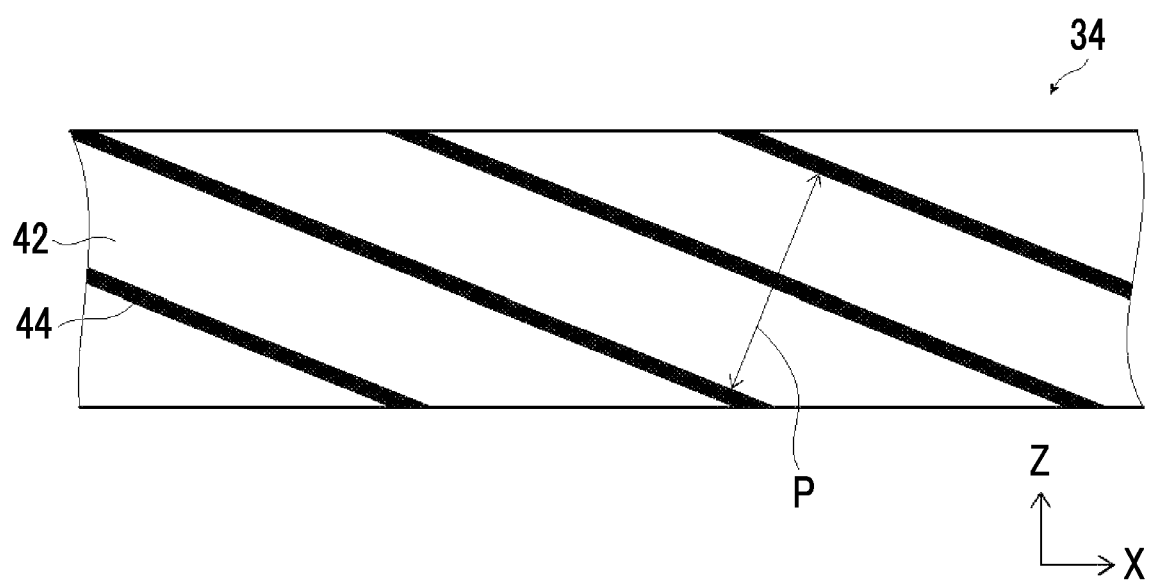
Figure 5:
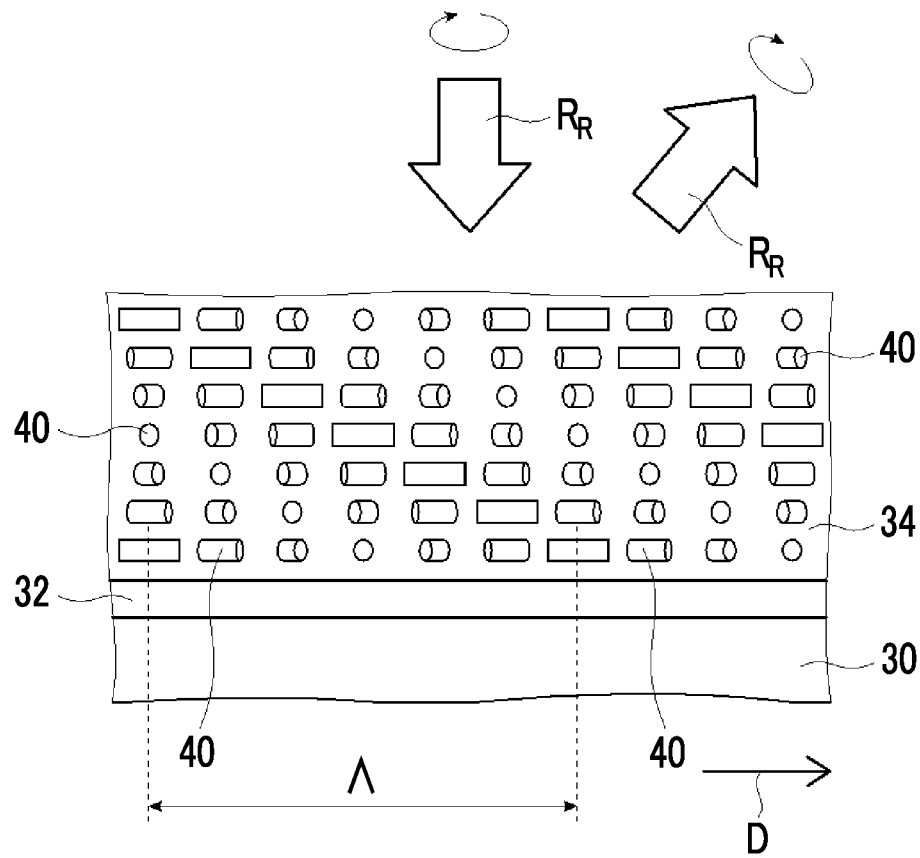
Figure 6:
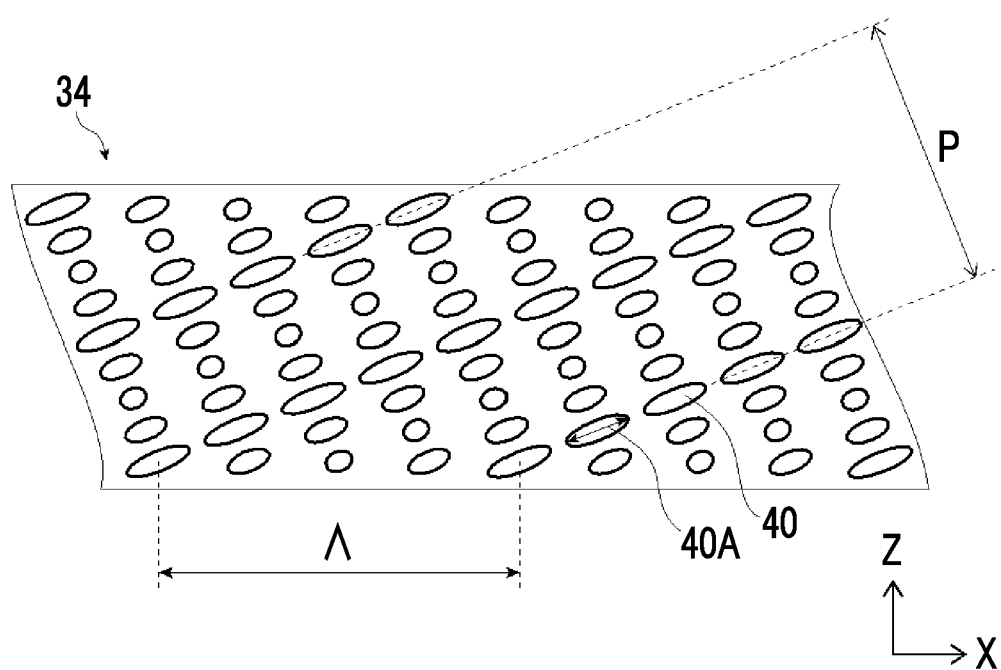
Figure 7:
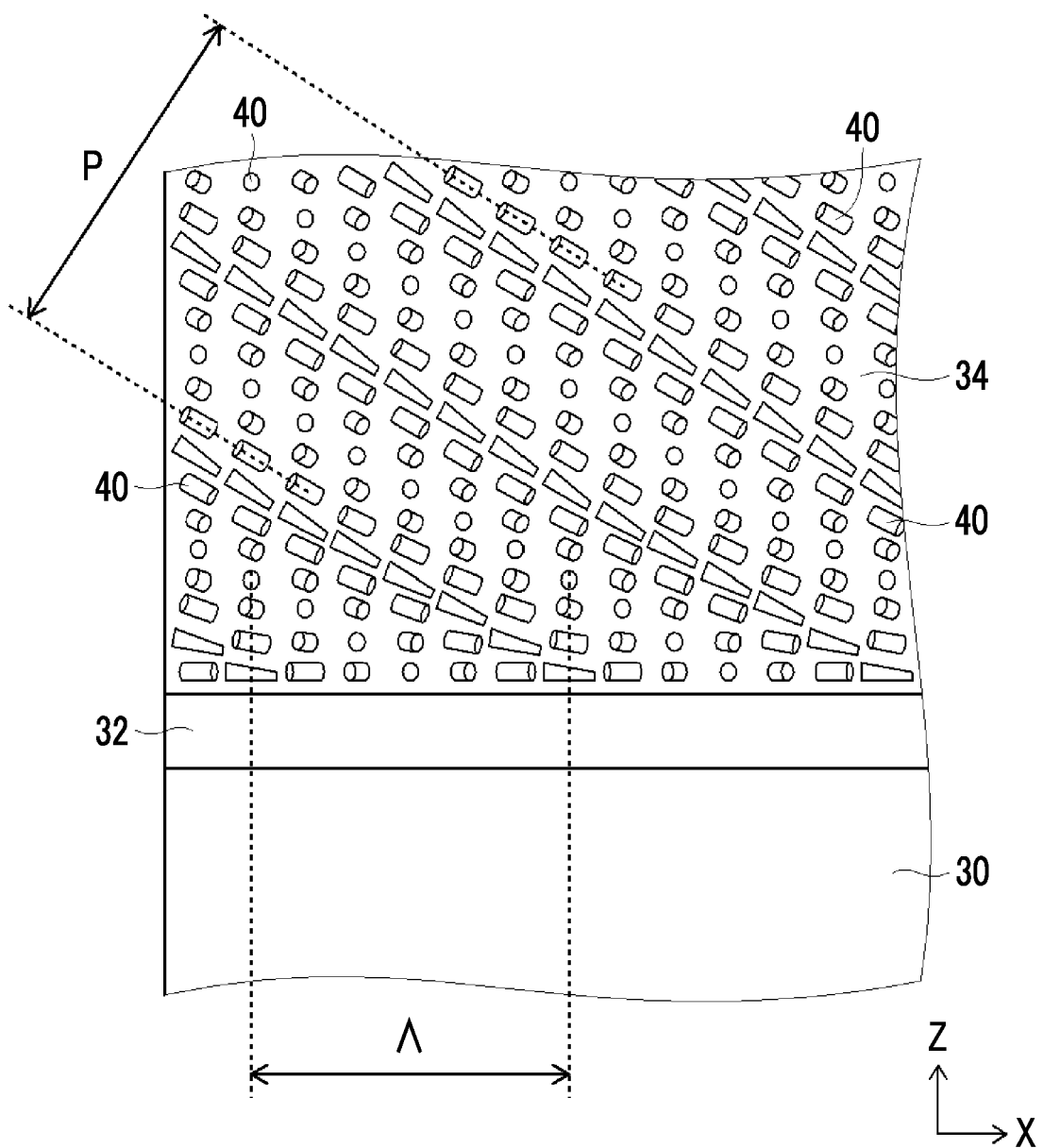
Figure 8:
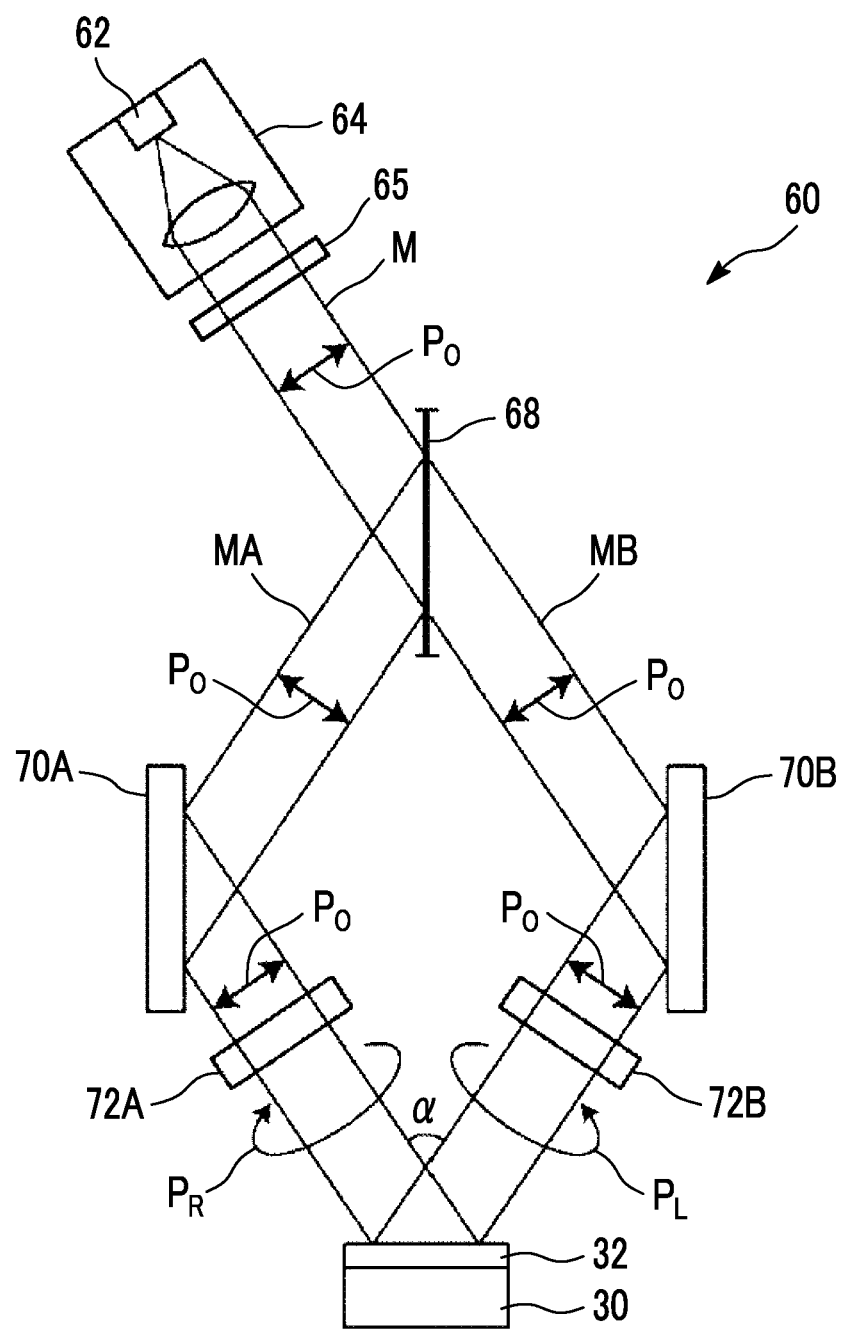
Figure 9:
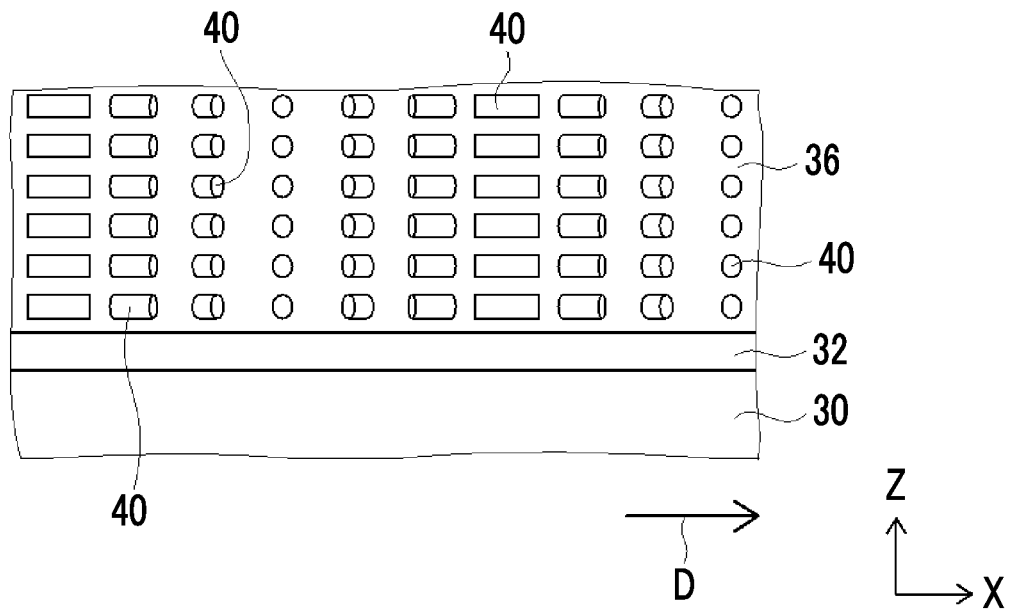
Figure 10:
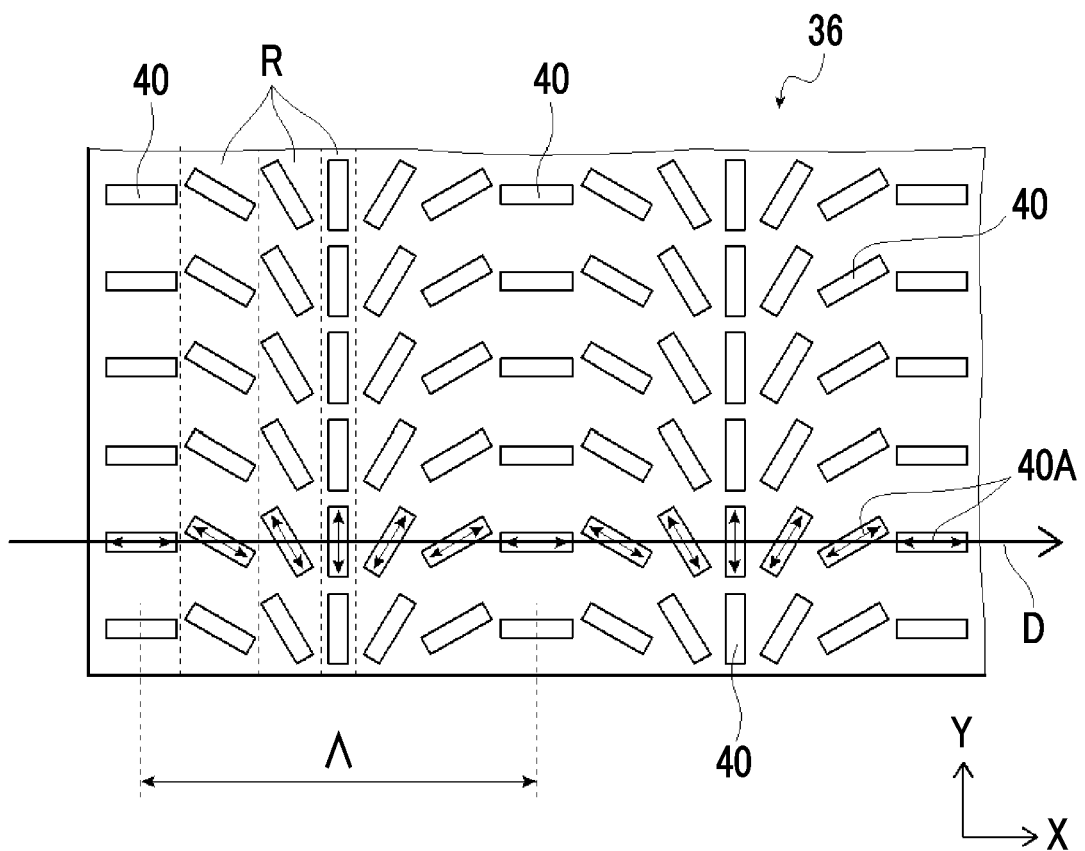
Figure 11:
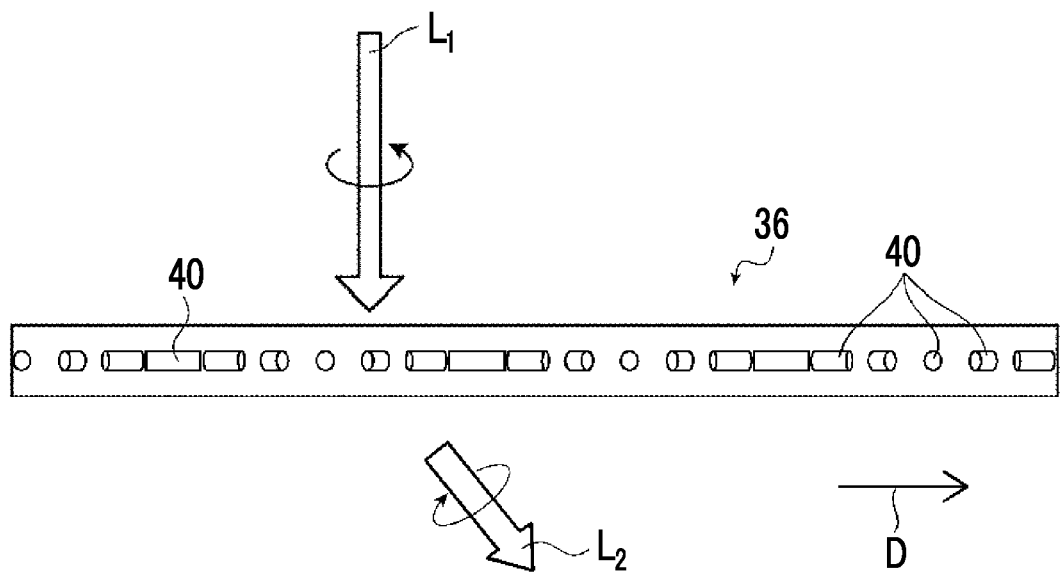
Figure 12:
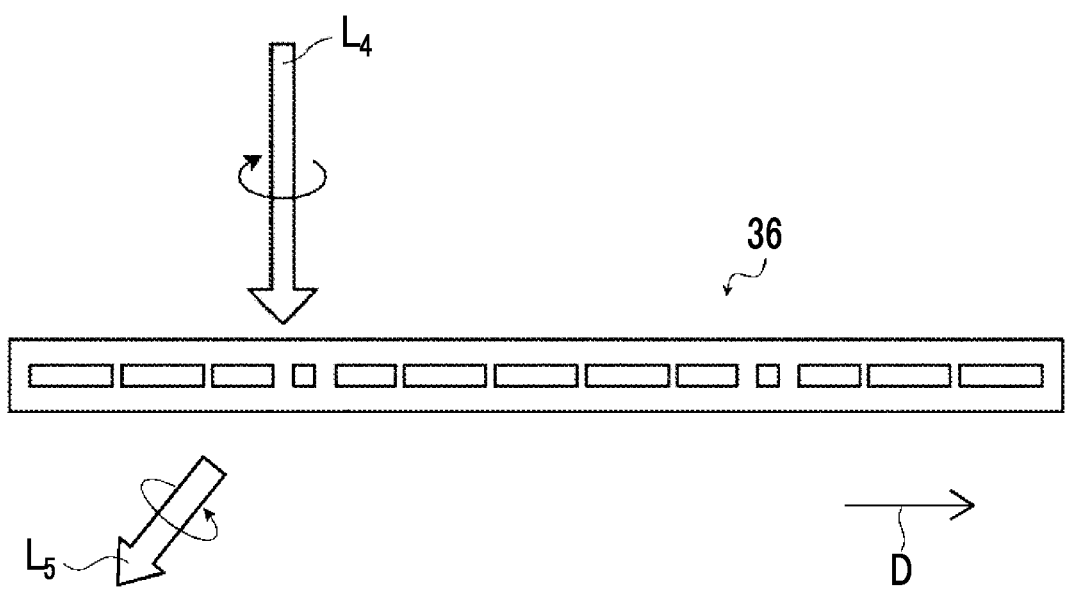
Figure 13:
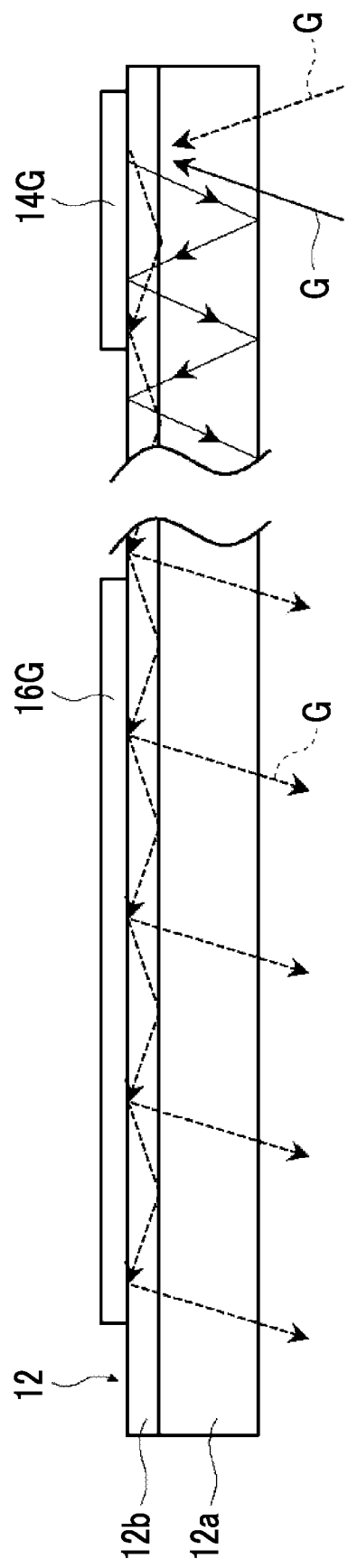
Figure 14:
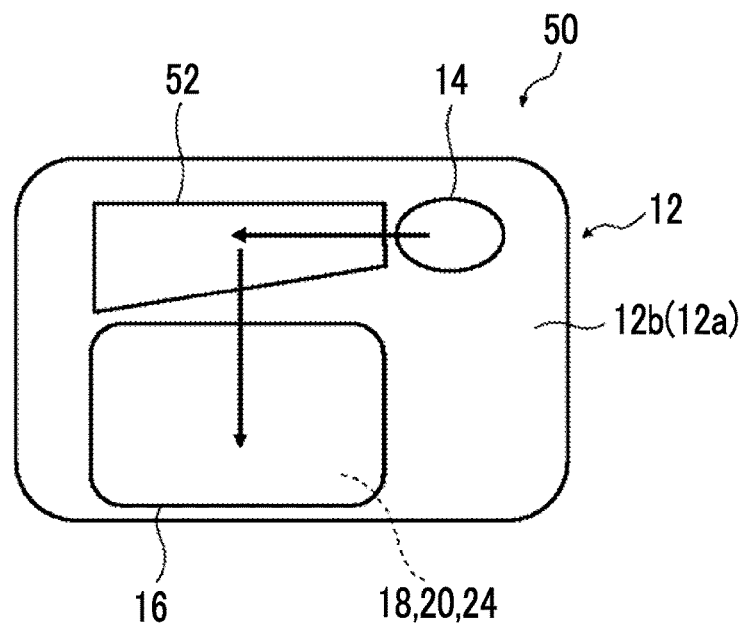
Figure 15:
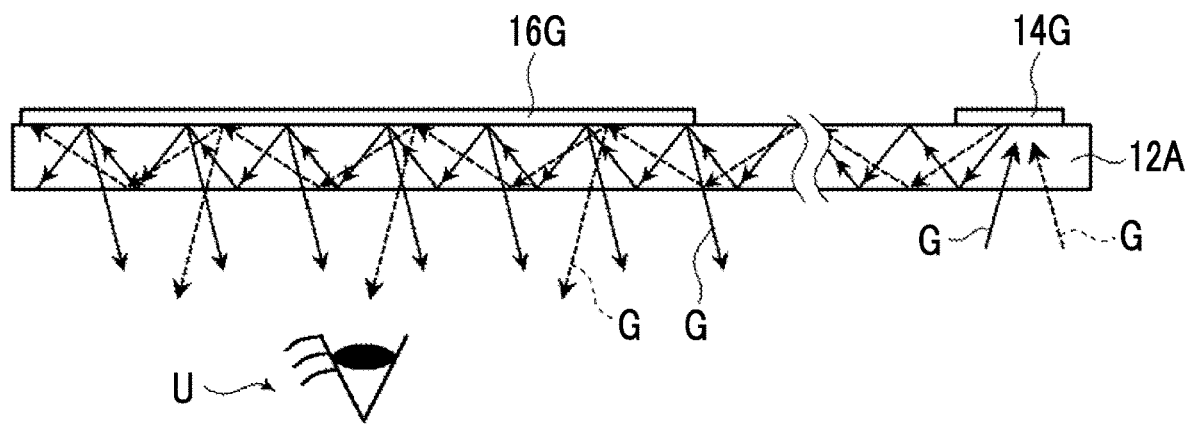
Figure 16:
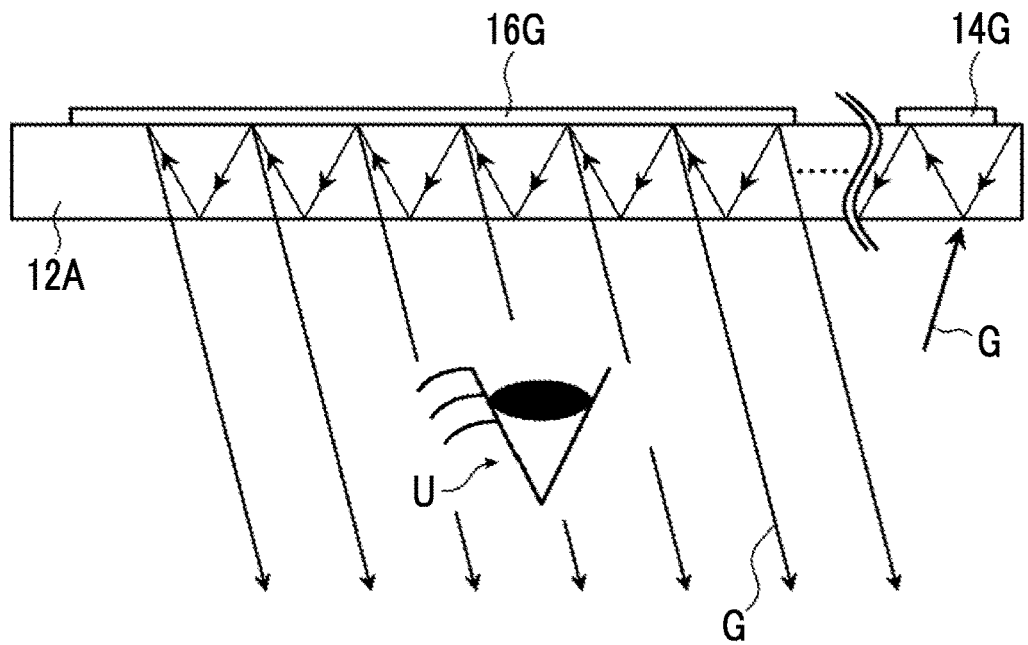
Figure 17:
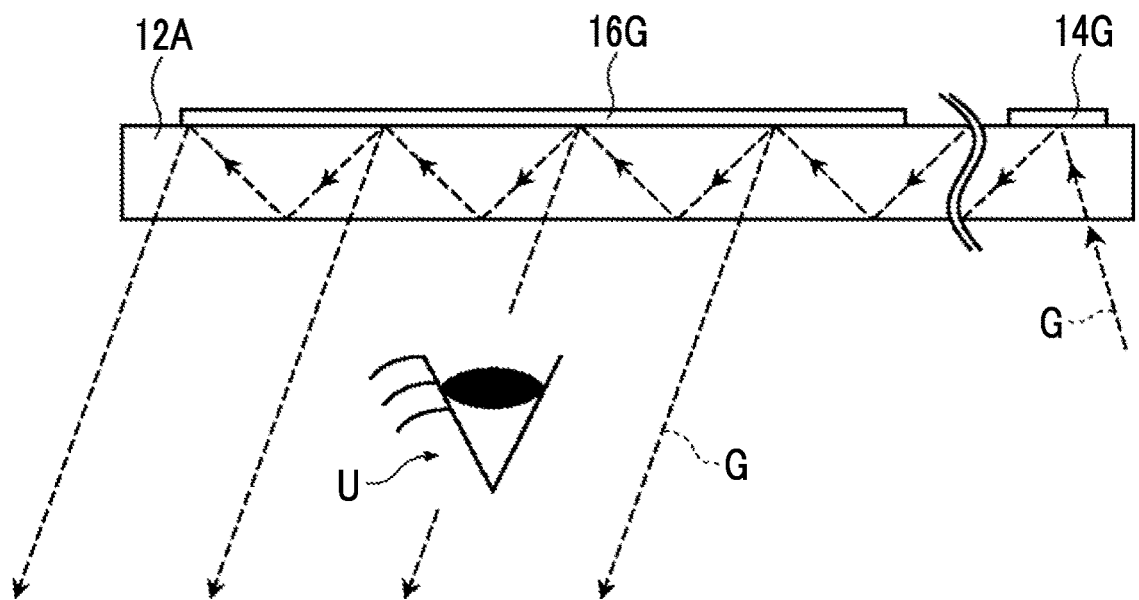
Figure 18:
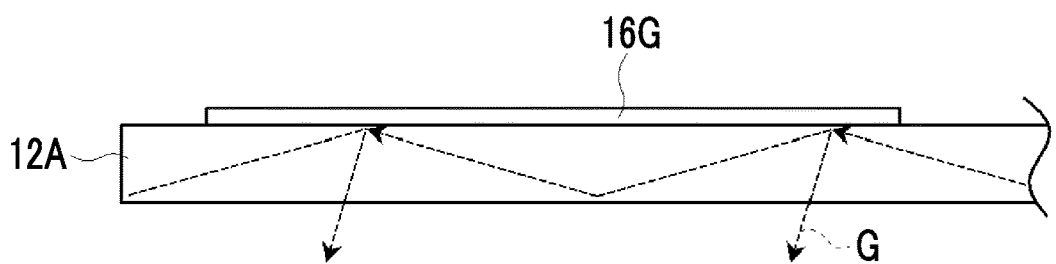

FIG. 1 is a diagram conceptually showing an example of a light guide element according to the present invention.
FIG. 2 is a diagram conceptually showing an example of a diffraction element.
FIG. 3 is a plan view conceptually showing a liquid crystal layer of the diffraction element shown in FIG. 2.
FIG. 4 is a diagram conceptually showing a cross-sectional scanning electron microscopic (SEM) image of the liquid crystal layer shown in FIG. 3.
FIG. 5 is conceptual diagram showing an action of a liquid crystal layer shown in FIG. 3.
FIG. 6 is a diagram conceptually showing another example of a liquid crystal layer in a diffraction element.
FIG. 7 is a diagram conceptually showing another example of the liquid crystal layer in the diffraction element.
FIG. 8 is a conceptual diagram showing an example of an exposure device that exposes an alignment film.
FIG. 9 is a diagram conceptually showing another example of the diffraction element.
FIG. 10 is a plan view conceptually showing the liquid crystal layer of the diffraction element shown in FIG. 9.
FIG. 11 is a conceptual diagram showing an action of the liquid crystal layer shown in FIG. 9.
FIG. 12 is a conceptual diagram showing the action of the liquid crystal layer shown in FIG. 9.
FIG. 13 is a conceptual diagram showing an action of a light guide element according to the present invention.
FIG. 14 is a diagram conceptually showing another example of the light guide element according to the present invention.
FIG. 15 is a conceptual diagram showing an action of a light guide element in the related art.
FIG. 16 is a conceptual diagram showing the action of the light guide element in the related art.
FIG. 17 is a conceptual diagram showing the action of the light guide element in the related art.
FIG. 18 is a conceptual diagram showing the action of the light guide element in the related art.

DESCRIPTION OF THE PREFERRED EMBODIMENTS

Hereinafter, a light guide element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

A light guide element according to an embodiment of the present invention includes: a light guide plate; and an incidence diffraction element and an emission diffraction element that are provided in the light guide plate.

In the light guide element according to the embodiment of the present invention, the light guide plate has a configuration in which a first light guide layer and a second light guide layer that has a higher refractive index and is thinner than the first light guide layer are laminated. In addition, both of the incidence diffraction element and the emission diffraction element are laminated and provided in the second light guide layer.

That is, in the light guide element according to the embodiment of the present invention, the first light guide layer, the second light guide layer, and the incidence/emission diffraction element are provided in this order.

FIG. 1 conceptually shows an example of the light guide element and the image display apparatus according to the embodiment of the present invention.

As shown in FIG. 1, a light guide element 10 includes: a light guide plate 12; an incidence diffraction unit 14 including an incidence diffraction element; and an emission diffraction unit 16 including an emission diffraction element.

The light guide plate 12 includes a layer of low refractive index 12a and a layer of high refractive index 12b that are laminated. In the present invention, the layer of high refractive index 12b has a higher refractive index than the layer of low refractive index 12a and is preferably thinner than or equal to the layer of low refractive index 12a.

In addition, in the light guide element 10 in the example shown in the drawing, the incidence diffraction unit 14 is provided in the vicinity of one end part of a main surface of the layer of high refractive index 12*b* of the light guide plate 12, and the emission diffraction unit 16 is provided in the vicinity of another end part of the main surface of the layer of high refractive index 12*b* of the light guide plate 12. The main surface is the maximum surface of a sheet-shaped material (a plate-shaped material, a film, or a layer).

In the light guide element 10, the incidence diffraction unit 14 includes: an R incidence diffraction element 14R that selectively reflects (diffracts) red (R) light; a G incidence diffraction element 14G that selectively reflects green (G) light; and a B incidence diffraction element 14B that selectively reflects blue (B) light.

On the other hand, the emission diffraction unit 16 includes: an R emission diffraction element 16R that selectively reflects red light; a G emission diffraction element 16G that selectively reflects green light; and a B emission diffraction element 16B that selectively reflects blue light.

In the light guide element 10, the members that are laminated are optionally bonded to each other using an adhesive layer.

The bonding layer may be a layer formed of an adhesive, may be a layer formed of a pressure sensitive adhesive, or a layer formed of a material having properties of both of an adhesive or a pressure sensitive adhesive as long as it has a sufficient light-transmitting property. The adhesive has fluidity during bonding and is subsequently solidified. The pressure sensitive adhesive is a gelled (rubber-like) flexible solid during bonding, and the gelled state does not change subsequently.

Accordingly, the bonding layer may be any well-known layer that is used for bonding a sheet-shaped material in an optical device or a light guide element, for example, an optical clear adhesive (OCA), an optically transparent double-sided tape, or an ultraviolet curable resin.

Alternatively, instead of bonding the members using the bonding layer, the members may be held using a frame, a jig, or the like to form the light guide element according to the embodiment of the present invention.

In the example shown in the drawing, all of the diffraction elements are reflective diffraction elements.

In the light guide element 10 in the example shown in the drawing, a red image R, a green image G, and a blue image B in a color image displayed by a display element (not shown) transmit through the light guide plate 12 and are diffracted and reflected by the R incidence diffraction element 14R, the G incidence diffraction element 14G, and the B incidence diffraction element 14B of the incidence diffraction unit 14, respectively, to be incident into the light guide plate 12.

The red image R, the green image G, and the blue image B incident into the light guide plate 12 propagate in the light guide plate 12 while being repeatedly reflected (preferably totally reflected), and is emitted to the emission diffraction unit 16.

The red image R, the green image G, and the blue image B incident into the emission diffraction unit 16 are diffracted and reflected by the R emission diffraction element 16R, the G emission diffraction element 16G, and the B emission diffraction element 16B of the emission diffraction unit 16, respectively, transmit through the light guide plate 12, and are emitted to an observation position by a user U to be observed as a color image.

The light guide element and the image display apparatus according to the embodiment of the present invention are not limited to those corresponding to display of a full color image consisting of a red image R, a green image G, and a blue image B.

That is, the light guide element and the image display apparatus according to the embodiment of the present invention may correspond to image display using two colors among the red image R, the green image G, and the blue image B. For example, in a case where the light guide element and the image display apparatus according to the embodiment of the present invention correspond to image display using two colors including the red image R and the green image G, the incidence diffraction unit 14 includes the R incidence diffraction element 14R and the g incidence diffraction element 14G, and the emission diffraction unit 16 includes the R emission diffraction element 16R and the G emission diffraction element 16G. In addition, in a case where the light guide element and the image display apparatus according to the embodiment of the present invention correspond to image display using two colors including the red image R and the blue image B, the incidence diffraction unit 14 includes the R incidence diffraction element 14R and the B incidence diffraction element 148, and the emission diffraction unit 16 includes the R emission diffraction element 16R and the B emission diffraction element 16B.

Further, the light guide element and the image display apparatus according to the embodiment of the present invention may correspond to display of a monochrome image using only one color among the red image R, the green image G, and the blue image B. That is, in the light guide element according to the embodiment of the present invention, the incidence diffraction unit 14 may include only any one of the R incidence diffraction element 14R, the G incidence diffraction element 14G, and the B incidence diffraction element 14B, and the emission diffraction unit 16 may include only one emission diffraction element corresponding to the same color.

Hereinafter, each of the components forming the image display apparatus and the display element according to the embodiment of the present invention will be described.

[Display Element]

In the image display apparatus according to the embodiment of the present invention, as the display element (not shown), various well-known display elements (a display device or a projector) used for AR glasses or the like can be used without any particular limitation. Examples of the display element include a display element including a display and a projection lens.

In the image display apparatus according to the embodiment of the present invention, the display is not particularly limited. For example, various well-known displays used in AR glasses or the like can be used.

Examples of the display include a liquid crystal display, an organic electroluminescent display, and a scanning type display employing a digital light processing (DLP) or Micro Electro Mechanical Systems (MEMS) mirror. Examples of the liquid crystal display include a liquid crystal on silicon (LCOS).

In the incidence diffraction unit 14, in a case where the incidence diffraction elements are laminated as in the example shown in the drawing, a display that displays a polychromic image using light components having wavelengths diffracted by the incidence diffraction elements is used.

In addition, as described below, in the incidence diffraction unit 14, in a case where the incidence diffraction elements are disposed at non-overlapping positions in the plane direction, a plurality of displays that emit monochromic images having wavelengths diffracted by the incidence diffraction element, respectively are used. In addition, in a case where a plurality of incidence diffraction elements are disposed at positions where they do not overlap each other in the plane direction, a configuration may be adopted in which light emitted from the display that displays a polychromic image is dispersed for each wavelength to be incident into the incidence diffraction element.

In the display element used in the image display apparatus according to the embodiment of the present invention, the projection lens is also a well-known projection lens used for AR glasses or the like. The projection lens may be a collimating lens.

Here, in the image display apparatus according to the embodiment of the present invention, a display image by the display element, that is, light to be emitted from the display element is not limited and is preferably unpolarized light (natural light) or circularly polarized light.

In a case where the display element emits circularly polarized light and the display emits an unpolarized light image, and it is preferable that the display element includes, for example, a circular polarization plate consisting of a linear polarizer and an λ/4 plate. In addition, in a case where the display emits a linearly polarized light image, it is preferable that the display element includes, for example, a λ/4 plate.

The light to be emitted by the display element may be, for example, another polarized light such as linearly polarized light.

[Light Guide Plate]

The light guide plate 12 is a well-known light guide plate that reflects light incident thereinto and propagates (guides) the reflected light.

As the light guide plate 12, various well-known light guide plates used for a backlight unit or the like of AR glasses or a liquid crystal display can be used without any particular limitation.

Here, in the light guide element 10 according to the embodiment of the present invention, the light guide plate 12 includes the layer of low refractive index 12a and the layer of high refractive index 12b that are laminated as described above. The layer of high refractive index 12b has a higher refractive index and is thinner than the layer of low refractive index 12a.

That is, the layer of low refractive index 12a is the first light guide layer in the present invention, and the layer of high refractive index 12b is the second light guide layer in the present invention. Accordingly, in the light guide element 10, in a case where a refractive index of the layer of low refractive index 12a (first light guide layer) is represented by n1, a refractive index of the layer of high refractive index 12b (second light guide layer) is represented by n2, a thickness of the layer of low refractive index 12a is represented by d1, and a thickness of the layer of high refractive index 12b is represented by d2, n1<n2 is satisfied and d1≥d2 is preferably satisfied.

The refractive index n1 of the layer of low refractive index 12a (first light guide layer) and the refractive index n2 of the layer of high refractive index 12b in the light guide element 10 can be measured using an Abbe refractometer or the like in portions where the incidence diffraction unit and the emission diffraction unit are not provided, respectively.

In addition, the thickness d1 of the layer of low refractive index 12a (first light guide layer) and the thickness d2 of the layer of high refractive index 12b can be measured in a state where cross sections are laminated, for example, by cutting the light guide element 10.

In the light guide element 10 according to the embodiment of the present invention, the light guide plate 12 is a characteristic member. The configuration and the effects of the light guide plate 12 including the layer of low refractive index 12a and the layer of high refractive index 12b will be described below.

[Incidence Diffraction Unit and Emission Diffraction Unit]

The incidence diffraction unit 14 includes the R incidence diffraction element 14R that selectively reflects the red image R (red light), the G incidence diffraction element 14G that selectively reflects the green image G (green light), and the B incidence diffraction element 14B that selectively reflects the blue image B (blue light).

In a preferable aspect, all of the R incidence diffraction element 14R, the G incidence diffraction element 14G, and the B incidence diffraction element 14B are reflective polarization diffraction elements. Specifically, in a preferable aspect, each of the incidence diffraction elements includes a cholesteric liquid crystal layer as a liquid crystal diffraction layer that diffracts incidence light, and selectively reflects right circularly polarized light or left circularly polarized light.

The turning directions of circularly polarized light that are selectively reflected by the R incidence diffraction element 14R, the G incidence diffraction element 14G, and the B incidence diffraction element 14B, that is, the helical twisted directions of the liquid crystal compounds in the cholesteric liquid crystalline phases may be the same as or different from each other.

In addition, in the incidence diffraction elements and the corresponding emission diffraction elements described below, the turning directions of circularly polarized light that is selectively reflected may be the same as or different from each other. It is preferable that the incidence diffraction element and the emission diffraction element corresponding to the same color selectively reflect circularly polarized light in the same turning direction.

In this example, for example, all of the R incidence diffraction element 14R, the G incidence diffraction element 14G, and the B incidence diffraction element 14B selectively reflect right circularly polarized light.

On the other hand, the emission diffraction unit 16 includes the R emission diffraction element 16R that selectively reflects the red image R (red light), the G emission diffraction element 16G that selectively reflects the green image G (green light), and the B emission diffraction element 16B that selectively reflects the blue image B (blue light).

In a preferable aspect, all of the R emission diffraction element 16R, the G emission diffraction element 16G, and the B emission diffraction element 16B are reflective polarization diffraction elements. Specifically, in a preferable aspect, each of the emission diffraction elements includes a cholesteric liquid crystal layer as a liquid crystal diffraction layer that diffracts incidence light.

The turning directions of circularly polarized light that are selectively reflected by the R emission diffraction element 16R, the G emission diffraction element 16G, and the B emission diffraction element 16B, that is, the helical twisted directions of the liquid crystal compounds in the cholesteric liquid crystalline phases may be the same as or different from each other.

In this example, for example, all of the R emission diffraction element 16R, the G emission diffraction element 16G, and the B emission diffraction element 16B selectively reflect right circularly polarized light.

The R incidence diffraction element 14R, the G incidence diffraction element 14G, and the B incidence diffraction element 14B have the same configuration and the R emission diffraction element 16R, the G emission diffraction element 16G, and the B emission diffraction element 16B have basically the same configuration, except that the wavelength ranges of light to be selectively reflected and/or the turning directions of circularly polarized light to be selectively reflected are different from each other.

Accordingly, in the following description, in a case where the diffraction elements do not need to be distinguished from each other, these diffraction elements will also be collectively referred to as "liquid crystal diffraction element".

(Liquid Crystal Diffraction Element)

The liquid crystal diffraction element will be described using FIGS. 2 to 4.

FIG. 2 is a diagram conceptually showing a layer configuration of the liquid crystal diffraction element. As conceptually shown in FIG. 2, the liquid crystal diffraction element includes a support 30, an alignment film 32, and a cholesteric liquid crystal layer 34 as a liquid crystal diffraction layer that exhibits an action as a diffraction element.

FIG. 3 is a schematic diagram showing an alignment state of a liquid crystal compound in a plane of a main surface of the cholesteric liquid crystal layer 34.

In the following description, it is assumed that a main surface of the cholesteric liquid crystal layer 34 is an X-Y plane and a cross-section perpendicular to the X-Y plane is a X-Z plane. That is, FIG. 2 corresponds to a schematic diagram of the X-Z plane of the cholesteric liquid crystal layer 34, and FIG. 3 corresponds to a schematic diagram of the X-Y plane of the cholesteric liquid crystal layer 34.

As shown in FIGS. 2 to 4, the cholesteric liquid crystal layer 34 is a layer obtained by cholesteric alignment of a liquid crystal compound. In addition. FIGS. 2 to 4 show an example in which the liquid crystal compound forming the cholesteric liquid crystal layer is a rod-like liquid crystal compound.

In the following description, the cholesteric liquid crystal layer will also be referred to as "liquid crystal layer".

The liquid crystal diffraction element shown in FIG. 2 includes the support 30, the alignment film 32, and the liquid crystal layer 34. However, the present invention is not limited to this configuration. The liquid crystal diffraction element may include only the alignment film 32 and the liquid crystal layer 34 by peeling off the support 30 after bonding the laminate to the light guide plate 12. Alternatively, the liquid crystal diffraction element may include only the liquid crystal layer 34 by peeling off the support 30 and the alignment film 32 after bonding the laminate to the light guide plate 12.

<Support>

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 34 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-119-152509A), or an alignment film such as JP2005-097377A, JP2005-099228A, and JP2005-128503A is preferable.

In the liquid crystal diffraction element, for example, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-

094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A. WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

FIG. 8 conceptually shows an example of an exposure device that exposes the alignment film 32 to form an alignment pattern.

An exposure device 60 shown in FIG. 8 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<Liquid Crystal Layer (Cholesteric Liquid Crystal Layer)>

In the liquid crystal diffraction element, the liquid crystal layer 34 is formed on a surface of the alignment film 32.

The liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically turned once (rotated by 360°) and laminated is set as one helical pitch (pitch P), and plural pitches of the helically turned liquid crystal compound 40 are laminated.

As is well known, the cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the liquid crystal layer 34 forming the R emission diffraction element 16R, the G emission diffraction element 16G, the B emission diffraction element 16B that selectively reflect right circularly polarized light, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and satisfies a relationship of Δλ=Δn×P. Therefore, the width of the selective reflection range can be controlled by adjusting Δn. Δn can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the diffraction element, the selective reflection wavelength range of the liquid crystal layer may be appropriately set, for example, by adjusting the helical pitch P of the liquid crystal layer according to each of the liquid crystal diffraction elements.

The half-width of the reflection wavelength range is adjusted depending on the use of the light guide element 10 and may be, for example, 10 to 500 nm and is preferably 20 to 300 nm and more preferably 30 to 100 nm.

As shown in FIG. 3, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ-180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating. In the liquid crystal diffraction element, the single period Λ is the period of the diffraction structure.

On the other hand, in the liquid crystal compound 40 forming the liquid crystal layer 34, the directions of the optical axes 40A are the same in the direction (in FIG. 3, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D (X direction) are the same in the Y direction.

In a case where the X-Z plane of the liquid crystal layer 34 shown in FIG. 2 is observed with a scanning electron microscope (SEM), an arrangement direction in which bright portions 42 and dark portions 44 are alternately arranged as shown in FIG. 4, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 4, two bright portions 42 and two dark portions 44 correspond to one helical pitch (one helical turn), that is, the pitch P.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 5.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction).

The liquid crystal alignment pattern formed in the liquid crystal layer 34 is a pattern that is periodic in the arrangement axis D direction. Therefore, as conceptually shown in FIG. 5, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane in the arrangement axis D direction. That is, the XY plane is a main surface of the cholesteric liquid crystal layer.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can e reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the R incidence diffraction element 14R, the G incidence diffraction element 14G, and the B incidence diffraction element 14B forming the incidence diffraction unit 14, depending on the turning direction of circularly polarized light to be selectively reflected, that is, the helical turning direction, the arrangement axis D direction and the rotation direction of the optical axis 40A in the liquid crystal alignment pattern are set such that incident light is appropriately directed to the emission diffraction unit 16.

On the other hand, in the R emission diffraction element 16R, the G emission diffraction element 16G, and the B emission diffraction element 16B forming the emission diffraction unit 16, depending on the turning direction of circularly polarized light to be selectively reflected, that is, the helical turning direction, the arrangement axis D direction and the rotation direction of the optical axis 40A in the liquid crystal alignment pattern are set such that incident light is appropriately emitted to the observation position by the user U.

In the liquid crystal diffraction element, in the liquid crystal alignment pattern of the liquid crystal compound in the liquid crystal layer, the single period $\Lambda$ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating is the periodic direction of the diffraction structure.

In the light guide element 10 according to the embodiment of the present invention, the length of the single period $\Lambda$ of the diffraction element is not particularly limited, and may be appropriately adjusted depending on the incidence angle into the light guide plate 12, the size of diffraction of light for emitting the light from the light guide plate 12, and the like.

The length of the single period of the diffraction element, in particular, the length of the single period $\Lambda$ of the emission diffraction element is preferably 0.1 µm to 10 µm, more preferably 0.1 µm to 1 µm, and still more preferably a wavelength λ or less of incident light from the viewpoint of propagating light in the light guide plate 12 by total reflection.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light.

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

Accordingly, in the light guide element 10 according to the embodiment of the present invention, in the R incidence diffraction element 14R, the G incidence diffraction element 14G, and the B incidence diffraction element 14B forming the incidence diffraction unit 14, it is preferable that a permutation of the selective reflection center wavelengths of the liquid crystal layers and a permutation of the single periods Λ match each other. Likewise, in the R emission diffraction element 16R, the G emission diffraction element 16G, and the B emission diffraction element 16B forming the emission diffraction unit 16, it is preferable that a permutation of the selective reflection center wavelengths of the liquid crystal layers and a permutation of the single periods Λ match each other.

Regarding this point, the same can be applied to the case where each of the incidence diffraction unit 14 and the emission diffraction unit 16 includes only two diffraction elements. In addition, regarding this point, the same can be applied to a case where the diffraction element is not a reflective liquid crystal diffraction element.

For example, in the incidence diffraction unit 14, the R incidence diffraction element 14R selectively reflects red light, the G incidence diffraction element 14G selectively reflects green light, and the B incidence diffraction element 14B selectively reflects blue light.

Accordingly, it is preferable that, among the single periods Λ of the liquid crystal alignment patterns of the incidence diffraction elements, the single period Λ of the liquid crystal layer 34 of the R incidence diffraction element 14R having the longest wavelength of the selectively reflected light is the longest, the single period Λ of the liquid crystal layer 34 of the G incidence diffraction element 14G having the second longest wavelength of the selectively reflected light is the second longest, and the single period Λ of the liquid crystal layer 34 of the B incidence diffraction element 14B having the shortest the wavelength of the selectively reflected light is the shortest.

With this configuration, the incidence directions of the red image R, the green image G. and the blue image B into the light guide plate 12 by the incidence diffraction unit 14 are made to match each other. Further, with this configuration, the emission directions of the red image R, the green image G, and the blue image B emitted from the emission diffraction unit 16 can be made to be the same. As a result, a color image having no color shift can be emitted from the light guide plate to the observation position by the user U of AR glasses.

In the example shown in FIG. 2, a configuration in which, on the X-Z plane of the liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 6, a configuration in which, on the X-Z plane of the liquid crystal layer 34, the optical axes 40A of the liquid crystal compound 40 is aligned to be tilted with respect to the main surface (X-Y plane) may be adopted.

In addition, the example shown in FIG. 6 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

For example, in an example shown in FIG. 7, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface) side.

This way, the liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer 34) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 34.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 5° or more from the viewpoint that the direction of the liquid crystal compound matches the bright portions and the dark portions more suitably such that the diffraction efficiency can be improved.

<<Method of Forming Liquid Crystal Layer>>

The liquid crystal layer 34 can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-116-016616A), JP1995-110469A (JP-1H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example. Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer 34 is not particularly limited, and the thickness with which a required light reflectivity can be obtained may be appropriately set depending on the use of the diffraction element, the light reflectivity required for the liquid crystal layer 34, the material for forming the liquid crystal layer 34, and the like.

<Other Liquid Crystal Layers (Liquid Crystal Diffraction Elements)>

In the light guide element in the example shown in the drawing, in the incidence diffraction unit 14 and the emission diffraction unit 16, a reflective liquid crystal diffraction element including the liquid crystal layer 34 as a cholesteric liquid crystal layer is used. However, the present invention is not limited to this configuration.

For example, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

FIGS. 9 and 10 show an example of another liquid crystal diffraction element.

A liquid crystal diffraction element shown in FIGS. 9 and 10 includes the support 30, the alignment film 32, and a liquid crystal layer 36. As the support 30 and the alignment film 32, those described above can be used.

As in the (cholesteric) liquid crystal layer 34, the liquid crystal layer 36 of the liquid crystal diffraction element shown in FIG. 10 also has the liquid crystal alignment pattern in which the optical axis 40A of the liquid crystal compound 40 continuously rotates along the arrangement axis D. FIG. 10 also shows only the liquid crystal compound of the surface of the alignment film 32 as in FIG. 3.

In the liquid crystal diffraction element shown in FIG. 9, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 36 has the liquid crystal alignment pattern in which the direction of the optical axis 40A derived from the liquid crystal compound 40 changes while continuously rotating in the arrangement axis D direction in a plane, that is, in the X direction.

On the other hand, regarding the liquid crystal compound 40 forming the liquid crystal layer 36, the liquid crystal compounds 40 having the same direction of the optical axes 40A are arranged at regular intervals in the Y direction perpendicular to the X direction, that is, the Y direction perpendicular to the arrangement axis D as the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the X direction (the one in-plane direction in which the direction of the optical axis of the liquid crystal compound 40 rotates) are the same. Regions where the liquid crystal compounds 40 in which the angles between the optical axes 40A and the arrangement axis D are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In a case where circularly polarized light is incident into the above-described liquid crystal layer 36, the light is refracted such that the direction of the circularly polarized light is converted.

This action is conceptually shown in FIGS. 11 and 12. In the liquid crystal layer 36, the value of the product of the difference in refractive index of the liquid crystal compound and the thickness of the optically-anisotropic layer is $\lambda/2$.

As shown in FIG. 11, in a case where the value of the product of the difference in refractive index of the liquid crystal compound in the liquid crystal layer 36 and the thickness of the optically-anisotropic layer is $\lambda/2$ and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 12, in a case where the value of the product of the difference in refractive index of the liquid crystal compound in the liquid crystal layer 36 and the thickness of the optically-anisotropic layer is $\lambda/2$ and incidence light $L_4$ of right circularly polarized light is incident into the liquid crystal layer 36, the incidence light $L_4$ transmits through the liquid crystal layer 36 to be imparted with a phase difference of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 34, by changing the single period $\Lambda$ of the liquid crystal alignment pattern formed in the liquid crystal layer 36, refraction angles of the transmitted light components $L_2$ and $L_5$ can be adjusted. Specifically, even in the liquid crystal layer 36, as the single period $\Lambda$ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 9 to 12, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In the light guide element according to the embodiment of the present invention, in a case where a transmission type diffraction element is used, a positional relationship between the diffraction element and the display element and the user U is opposite to that of a case where a reflective diffraction element is used. That is, the light guide element is configured such that an image from the display element is incident from the incidence diffraction unit side instead of the light guide plate 12, the image is incident into the emission diffraction unit from the light guide plate, and the image transmitted through the emission diffraction unit is emitted to the observation position by the user U.

In addition, in the incidence diffraction unit 14 and the emission diffraction unit 16 of the light guide element according to the embodiment of the present invention, different liquid crystal diffraction elements may be used.

For example, a transmissive liquid crystal diffraction element including the liquid crystal layer 36 may be used in the incidence diffraction unit 14, and a reflective liquid crystal diffraction element including the liquid crystal layer 34 may be used in the emission diffraction unit 16.

The diffraction element used in the incidence diffraction unit 14 and the emission diffraction unit 16 is not limited to the above-described liquid crystal diffraction element having the liquid crystal alignment pattern.

As the diffraction element, for example, a volume hologram diffraction element or a surface relief diffraction element may be used. In addition, a reflective diffraction element that reflect linearly polarized light having wavelength selectivity and where a liquid crystal portion and a liquid crystal polymer portion are alternately provided can also be used.

In the light guide element according to the embodiment of the present invention, regardless of the diffraction element to be used, the incidence diffraction element (incidence diffraction unit) and the emission diffraction element (emission diffraction unit) are laminated and provided in the layer of high refractive index 12b of the light guide plate 12.

That is, regardless of whether the diffraction element is a reflective type or a transmission type, in the light guide element according to the embodiment of the present invention, the layer of low refractive index 12a of the light guide plate 12, the layer of high refractive index 12b of the light guide plate 12, and the incidence diffraction unit (incidence diffraction element)/the emission diffraction unit (emission diffraction unit) are provided in this order.

The incidence diffraction unit 14 of the light guide element 10 in the example shown in the drawing has the configuration in which the R incidence diffraction element 14R, the G incidence diffraction element 14G, and the B incidence diffraction element 14B are laminated. However, the present invention is not limited to this configuration.

For example, the R incidence diffraction element 14R, the G incidence diffraction element 14G, and the B incidence diffraction element 14B may be disposed at different positions in the main surface of the light guide plate 12. Alternatively, a laminate in which the R incidence diffraction element 14R and the B incidence diffraction element 14B are laminated and the G incidence diffraction element 14G may be disposed at different positions in the main surface of the light guide plate 12.

From the viewpoint of, for example, reducing the size of the light guide element 10, it is advantageous that the R incidence diffraction element 14R, the G incidence diffraction element 14G, and the B incidence diffraction element 14B are laminated. On the other hand, from the viewpoint of preventing inappropriate reflection such as reflection of an image from an unintended diffraction element on the image incidence side, it is advantageous in terms of image quality that the R incidence diffraction element 14R, the G incidence diffraction element 14G, and the B incidence diffraction element 14B are disposed at different positions in the main surface of the light guide plate 12.

[Action of Light Guide Element]

Hereinafter, the light guide element and the display device according to the embodiment of the present invention will be described in more detail by describing the action of the light guide element 10.

As described above, in the display device including the light guide element 10, the red image R, the green image G, and the blue image B projected from a display element (not shown) transmits through the light guide plate 12 and are incident into the incidence diffraction unit 14. The red image R is diffracted and reflected in a direction toward the emission diffraction unit 16 by the R incidence diffraction element 14R as right circularly polarized light, the green image G is diffracted and reflected in the direction toward the emission diffraction unit 16 by the G incidence diffraction element 14G as right circularly polarized light, and the blue image B is diffracted and reflected in the direction toward the emission diffraction unit 16 by the B incidence diffraction element 14B as right circularly polarized light. As a result, the red image R, the green image G, and the blue image B are incident into the light guide plate 12.

The red image R, the green image G, and the blue image B incident into the light guide plate 12 propagate in the light guide plate 12 while being repeatedly reflected, and is emitted to the emission diffraction unit 16.

Among the respective color images incident into the emission diffraction unit 16, the red image R is diffracted and reflected by the R emission diffraction element 16R as right circularly polarized light, the green image G is diffracted and reflected by the G emission diffraction element 16G as right circularly polarized light, and the blue image B is diffracted and reflected by the B emission diffraction element 16B as right circularly polarized light. The red image R, the green image G, and the blue image B transmit through the light guide plate 12 and are emitted to the observation position by the user U to be observed as a full color image. The emission diffraction unit 16 allows transmission of left circularly polarized light. Therefore, the user U can observe a scenery on the side toward the emission diffraction unit 16 using the left circularly polarized light.

Here, as described above, the light guide plate 12 of the light guide element 10 according to the embodiment of the present invention includes the layer of low refractive index 12a (first light guide layer) and the layer of high refractive index 12b (second light guide layer) that are laminated, in which the layer of high refractive index 12b has a higher refractive index and is thinner than the layer of low refractive index 12a.

The layer of low refractive index 12a is the first light guide layer in the present invention, and the layer of high refractive index 12b is the second light guide layer in the present invention. Accordingly, in the light guide element 10, in a case where a refractive index of the layer of low refractive index 12a (first light guide layer) is represented by n1, a refractive index of the layer of high refractive index 12b (second light guide layer) is represented by n2, a thickness of the layer of low refractive index 12a is represented by d1, and a thickness of the layer of high refractive index 12b is represented by d2, n1<n2 is satisfied and d1≥d2 is preferably satisfied.

The light guide element 10 according to the embodiment of the present invention has the above-described configuration. As a result, for example, in an image display apparatus including a light guide plate, for example, in AR glasses, irrespective of the visual line of the user U, the position of eyes of the user U, and the like, a phenomenon in which the image cannot be partially seen, that is, so-called partial deterioration in image sharpness can be suppressed, and the entire image can be appropriately observed.

FIG. 15 conceptually shows an example of a light guide element in the related art.

In order to simplify the drawings to clarify the action of the light guide plate, FIGS. 13 and 15 to 18 described below only show the G incidence diffraction element 14G and the G emission diffraction element 16G corresponding to the green image G in an intermediate wavelength range. However, regarding the action of the light guide plate, the same can be applied to the red image R, the blue image B, and the incidence diffraction element and the emission diffraction element corresponding to these images.

The light guide element shown in FIG. 15 includes a typical light guide plate 12A having a monolayer configuration. Accordingly, the refractive index of the light guide plate 12A is basically uniform in the entire area.

As described above, the green image G incident from the display element (not shown) into the light guide element transmit through the light guide plate 12A, is incident into the G emission diffraction element 16G, is diffracted and reflected in the direction toward the emission diffraction unit 16 by the G incidence diffraction element 14G as right circularly polarized light, is incident into the light guide plate 12A, and propagates to the G emission diffraction element 16G.

Here, the incidence direction of the green image G into the light guide element varies depending on display positions in the display element.

For example, as indicated by a solid line in the drawing, the green image G displayed on the left side of the display element in the drawing travels in a direction away from the G emission diffraction element 16G, is incident into the G incidence diffraction element 14G, and is reflected (diffracted). On the other hand, as indicated by a broken line in the drawing, the green image G displayed on the right side of the display element in the drawing travels in the direction toward the G emission diffraction element 16G, is incident into the G incidence diffraction element 14G, and is reflected (diffracted).

A diffraction direction and an angle of the G incidence diffraction element 14G are set such that light components incident from the display element in different incidence directions are directed toward the G emission diffraction element 16G.

Accordingly, the green image G that is displayed on the left side of the display element, travels in the direction away from the G emission diffraction element 16G, and is indicated by a solid line is reflected by the G incidence diffraction element 14G in a direction returning to the side opposite to the traveling direction. Therefore, as shown in FIG. 15, the green image G indicated by the solid line is incident into the light guide plate 12A at an angle close to the normal line of the light guide plate 12A, and propagates to the G emission diffraction element 16G while being repeatedly reflected from an interface between the light guide plate 12A and air.

On the other hand, the green image G that is displayed on the right side of the display element, travels in the direction toward the G emission diffraction element 16G, and is indicated by the broken line is reflected by the G incidence diffraction element 14G in a direction toward the G emission diffraction element 16G. Therefore, the green image G indicated by the broken line is incident into the light guide plate 12A at a large angle with respect to the normal line of the light guide plate 12A, and propagates to the G emission diffraction element 16G while being repeatedly reflected from an interface between the light guide plate 12A and air.

In addition, the normal line is a line perpendicular to the main surface of the sheet-shaped material.

Accordingly, as shown in FIG. 15, regarding the green image G indicated by the solid line, the reflection positions at the interface between the light guide plate 12A and air are close to each other in the propagation direction, and the green image G propagates toward the G emission diffraction element 16G while being repeatedly reflected at narrow intervals.

On the other hand, as shown in FIG. 15, regarding the green image G indicated by the broken line, the reflection positions at the interface between the light guide plate 12A and air are spaced from each other in the propagation direction as compared to the green image G indicated by the solid line, and the green image G propagates toward the G emission diffraction element 16G while being repeatedly reflected at wide intervals.

That is, regarding the green image G indicated by the solid line, as conceptually shown in FIG. 16, the incidence interval into the G emission diffraction element 16G becomes narrow, and the green image G is reflected (diffracted) at narrow intervals and is emitted to the observation position by the user U.

Therefore, the green image G that is displayed on the left side of the display element and is indicated by the solid line is incident into the eyes of the user U although the visual line of the user U and the position of the eyes vary. Accordingly, the green image G that is displayed on the left side of the display element and is indicated by the solid line is appropriately observed by the user U without partial deterioration in image sharpness.

On the other hand, regarding the green image G indicated by the broken line, as conceptually shown in FIG. 17, the incidence interval into the G emission diffraction element 16G becomes wide, and the green image G is reflected (diffracted) at wide intervals and is emitted to the observation position by the user U.

Therefore, the green image G that is displayed on the right side of the display element and is indicated by the broken line may not be incident into the eyes of the user U in a case where the visual line of the user U and the position of the eyes vary. Accordingly, there may be a case where the green image G that is displayed on the right side of the display element and is indicated by the broken line cannot be appropriately observed by the user U due to partial deterioration in image sharpness.

On the other hand, as conceptually shown in FIG. 13, in the light guide element 10 according to the embodiment of the present invention, the light guide plate 12 includes the layer of low refractive index 12a and the layer of high refractive index 12b, in which the layer of high refractive index 12b has a higher refractive index and is thinner than the layer of low refractive index 12a. Further, both of the G incidence diffraction element 14G (incidence diffraction unit 14) and the G emission diffraction element 16G (emission diffraction unit 16) are provided in the layer of high refractive index 12b.

In the light guide element 10 according to the embodiment of the present invention, as shown in FIG. 13, as described above, the green image G that is displayed on the left side of the display element in the drawing and is indicated by the solid line travels in the direction away from the G emission diffraction element 16G, transmits through the layer of low refractive index 12a and the layer of high refractive index 12b, and is incident into the G incidence diffraction element 14G.

Likewise, the green image G that travels in the direction away from the G emission diffraction element 16G and is indicated by the solid line is reflected by the G incidence diffraction element 14G in a direction returning to the side opposite to the traveling direction. Therefore, as shown in FIG. 13, as described above, the green image G indicated by the solid line is incident into the layer of high refractive index 12b of the light guide plate 12 at an angle close to the normal line of the light guide plate 12A, transmits through the layer of high refractive index 12b and the layer of low refractive index 12a, and propagates to the G emission diffraction element 16G while being repeatedly reflected from an interface between the light guide plate 12 and air.

Accordingly, as shown in FIGS. 15 and 16, regarding the green image G indicated by the solid line, the reflection positions at the interface between the light guide plate 12 and air are close to each other in the propagation direction, and the green light G propagates toward the G emission diffraction element 16G while being repeatedly reflected at narrow intervals. As a result, regarding the green image G indicated by the solid line, as shown in FIG. 16, the incidence interval into the G emission diffraction element 16G becomes narrow, and the green image G is reflected (diffracted) at narrow intervals and is emitted to the observation position by the user U.

Therefore, as shown in FIG. 16, the green image G that is displayed on the left side of the display element and is indicated by the solid line is incident into the eyes of the user U although the visual line of the user U and the position of the eyes vary. As a result, the green image G is appropriately observed by the user U without partial deterioration in image sharpness.

On the other hand, in the light guide element 10, as conceptually shown in FIG. 13, as described above, the green image G that is displayed on the right side of the display element and is indicated by the solid line in the drawing travels in the direction toward the G emission diffraction element 16G, transmits through the layer of low refractive index 12a and the layer of high refractive index 12b, and is incident into the G incidence diffraction element 14G.

As described above, the green image G that travels in the direction toward the G emission diffraction element 16G and is indicated by the solid line is reflected by the G incidence diffraction element 14G in the direction toward the G emission diffraction element 16G. Therefore, the green image G indicated by the broken line is incident into the layer of high refractive index 12b of the light guide plate 12 at a large angle with respect to the normal line of the light guide plate 12A.

Here, the light guide plate 12 includes the layer of low refractive index 12a and the layer of high refractive index 12b that are laminated, in which the layer of high refractive index 12b has a higher refractive index than the layer of low refractive index 12a. Therefore, the green image G that is incident into the layer of high refractive index 12b at a large angle with respect to the normal line of the light guide plate 12 and is indicated by the broken line is reflected at an interface between the layer of low refractive index 12a and the layer of high refractive index 12b due to the difference in refractive index between the layer of low refractive index 12a and the layer of high refractive index 12b.

As a result, the green image G indicated by the broken line propagates in the layer of high refractive index 12b to be emitted to the G emission diffraction element 16G while being repeatedly reflected at the interface between the layer of high refractive index 12b and air and at the interface between the layer of low refractive index 12a and the layer of high refractive index 12b.

Here, the thickness of the layer of high refractive index 12b is preferably less than or equal to that of the layer of low refractive index 12a. With this configuration, in the layer of high refractive index 12b, the travel distance of the green image G in the thickness direction and the propagation direction is less than or equal to that in the layer of low refractive index 12a. Therefore, regarding the green image G indicated by the broken line that propagates in the layer of high refractive index 12b while being repeatedly reflected, the reflection positions at the interface between the layer of high refractive index 12b and air and the reflection positions at the interface between the layer of low refractive index 12a and the layer of high refractive index 12b are close to each other in the propagation direction as compared to a case where the green image G propagates while being reflected at interfaces between both surfaces of the light guide plate 12 and air.

As a result, in the light guide element 10 according to the embodiment of the present invention, as compared to a case where the typical light guide plate 12A shown in FIG. 18 is used, regarding the green image G that is displayed on the right side of the display element and is indicated by the broken line, as shown in FIG. 13, the incidence interval into the G emission diffraction element 16G becomes narrow, and the green image G is reflected (diffracted) at narrow intervals and is emitted to the observation position by the user U.

Therefore, the green image G that is displayed on the right side of the display element and is indicated by the broken line is also incident into the eyes of the user U although the visual line of the user U and the position of the eyes vary. Accordingly, the green image G that is displayed on the right side of the display element and is indicated by the solid line is also appropriately observed by the user U without partial deterioration in image sharpness.

That is, in the light guide element and the display device according to the embodiment of the present invention, even in a case where the visual line of the user U and the position of the eyes vary, the entire area of an image can be appropriately observed irrespective of a display position in the display element without partial deterioration in image sharpness.

In the light guide element 10 according to the embodiment of the present invention, the difference in refractive index between the layer of low refractive index 12a and the layer of high refractive index 12b of the light guide plate 12 is not particularly limited as long as the refractive index of the layer of high refractive index 12b is more than the refractive index of the layer of low refractive index 12a.

In a case where the refractive index of the layer of low refractive index 12a (first light guide layer) is represented by n1 and the refractive index of the layer of high refractive index 12b (second light guide layer) is represented by n2, it is preferable that n2−n1>0.1 is satisfied, it is more preferable that n2−n1>0.2 is satisfied, and it is still more preferable that n2−n1>0.3 is satisfied.

It is preferable that the refractive indices of the layer of low refractive index 12a and the layer of high refractive index 12b satisfy n2−n1>0.1 from the viewpoints that, for example, the reflectivity of light propagating in the layer of high refractive index 12b can be increased and the angle range of diffracted light propagating in the layer of high refractive index 12b with respect to the normal line of the light guide plate 12 can be widened.

In addition, in the light guide element 10 according to the embodiment of the present invention, in a case where a refractive index of the incidence diffraction element (14R, 14G, and 14B) and the emission diffraction element (16R, 16G, and 16B) is represented by nD, it is preferable that n1<Dn is satisfied, it is more preferable that Dn−n1>0.05 is satisfied, and it is still more preferable that Dn−n1>0.1 is satisfied.

It is preferable that the refractive index of the incidence diffraction element and the emission diffraction element and the refractive index of the layer of low refractive index satisfy n1<Dn from the viewpoints that, for example, reflection of light at an interface between the layer of high refractive index 12h and the diffraction element can be prevented and light can be made to be suitably incident into the diffraction element.

In the present invention, the refractive index refers to a refractive index at a wavelength of 550 nm.

In addition, in a case where a member has birefringence, the refractive index refers to an average value of a refractive index ne of an extraordinary ray and a refractive index no of an ordinary ray.

In the light guide element 10 according to the embodiment of the present invention, a difference in thickness between the layer of low refractive index 12a and the layer of high refractive index 12b of the light guide plate 12 is not particularly limited.

In a case where the thickness of the layer of low refractive index 12a (first light guide layer) is represented by d1 and the thickness of the layer of high refractive index 12b (second light guide layer) is represented by d2, it is preferable that d1≥d2 is satisfied, it is more preferable that d2/d1<1.0 is satisfied, it is still more preferable that d2/d1<0.7 is satisfied, and it is still more preferable that d2/d1<0.5 is satisfied.

It is preferable that the thicknesses of the layer of low refractive index 12a and the layer of high refractive index 12b satisfy d2−d1<0.7 from the viewpoint that, for example, an interval of reflection positions in a propagation direction of light that propagates while repeatedly reflected in the layer of high refractive index 12b can be narrowed such that an interval of light that is diffracted and emitted by the emission diffraction element can be narrowed.

FIG. 14 conceptually shows another example of the light guide element according to the embodiment of the present invention.

FIG. 14 is a diagram in a case where the light guide element is seen from a direction perpendicular to the main surface of the light guide plate. That is. FIG. 14 is a diagram in a case where the light guide element is seen from the top of FIG. 1.

The light guide element 10 shown in FIG. 1 includes: the incidence diffraction unit 14 including the R incidence diffraction element 14R, the G incidence diffraction element 14G, and the B incidence diffraction element 14B; and the emission diffraction unit 16 including the R emission diffraction element 16R, the G emission diffraction element 16G, and the B emission diffraction element 16B.

On the other hand, a light guide element 50 shown in FIG. 14 includes: in addition to the incidence diffraction unit 14 and the emission diffraction unit 16, an intermediate diffraction unit 52 in which an R intermediate diffraction element, a G intermediate diffraction element, and a B intermediate diffraction element are laminated.

The R intermediate diffraction element is the same as the R incidence diffraction element 14R except that the single periods Λ are different, and is a diffraction element that selectively reflects right circularly polarized light of the red image R (red light). The G intermediate diffraction element is the same as the G incidence diffraction element 14G except that the single periods Λ are different, and is a diffraction element that selectively reflects right circularly polarized light of the green image G (green light). The B intermediate diffraction element is the same as the B incidence diffraction element 14B except that the single periods Λ are different, and is a diffraction element that selectively reflects right circularly polarized light of the blue image B (blue light).

Circularly polarized light components that are selectively reflected by the R intermediate diffraction element, the G intermediate diffraction element, and the B intermediate diffraction element may be the same as or different from each other and, for example, may be the same as those of the emission diffraction element.

In the light guide element 50, as shown in FIG. 14, the respective color images incident into the incidence diffraction unit 14 are reflected (diffracted) to the intermediate diffraction unit 52 to be incident into the light guide plate 12 by the R incidence diffraction element 14R, the G incidence diffraction element 14G, and the B incidence diffraction element 14B of the incidence diffraction unit 14.

The respective color images incident into the light guide plate 12 are reflected in the light guide plate 12, propagate from the incidence diffraction unit 14 to the intermediate diffraction unit 52, and are reflected (diffracted) to the emission diffraction unit 16 by the R intermediate diffraction element, the G intermediate diffraction element, and the B intermediate diffraction element of the intermediate diffraction unit 52. As in the above-described light guide element 10, depending on the incidence direction into the incidence diffraction unit 14, the image of each of the colors incident into the light guide plate 12 propagates in the layer of high refractive index 12b while being repeatedly reflected or propagates while repeatedly reflected in the entire area of the light guide plate 12 consisting of the layer of low refractive index 12a and the layer of high refractive index 12b. Regarding this point, the same can be applied to the image reflected from the intermediate diffraction unit 52.

The respective color images diffracted by the intermediate diffraction unit 52 are reflected in the light guide plate 12, propagate from the intermediate diffraction unit 52 to the emission diffraction unit 16, are incident into the emission diffraction unit 16, are reflected (diffracted) by the R emission diffraction element 16R, the G emission diffraction element 16G, and the B emission diffraction element 16B, and are emitted from the light guide plate 12.

In the emission diffraction unit 16, the images diffracted by the corresponding emission diffraction elements are emitted from the light guide plate 12 to the observation position by the user U.

Here, as in the above-described example, the light emitted from the emission diffraction unit 16 is reflected (diffracted)

at narrow intervals and is emitted to the observation position by the user U irrespective of the incidence direction into the incidence diffraction unit 14. Therefore, even in a case where the visual line of the user U and the position of the eyes vary, the entire area of an image can be appropriately observed irrespective of a display position in the display element without partial deterioration in image sharpness.

By providing the intermediate diffraction unit 52, the field of view (FOV) can be widened in AR glasses including the light guide element according to the embodiment of the present invention.

Even in the intermediate diffraction unit 52, it is preferable that a permutation of the wavelengths of light to be selectively reflected (diffracted) and a permutation of the single periods Λ of the liquid crystal alignment patterns of the diffraction elements match each other.

That is, regarding the single period Λ of the liquid crystal alignment pattern of each of the diffraction elements in the intermediate diffraction unit 52, it is preferable that the single period Λ of the R intermediate diffraction element having the longest wavelength of the selectively reflected light is the longest, the single period Λ of the G intermediate diffraction element having the second longest wavelength of the selectively reflected light is the second longest, and the single period Λ of the B intermediate diffraction element having the shortest wavelength of the selectively reflected light is the shortest.

As the diffraction element forming the intermediate diffraction unit 52, various well-known diffraction elements can be used.

In addition, for the light guide element including the intermediate diffraction unit (intermediate diffraction elements), various well-known configurations such as a configuration disclosed in JP2006-546020A can be used.

Hereinabove, the light guide element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention.

Accordingly, the scope of the present invention is not limited to the following specific examples.

Example 1

(Formation of Alignment Film)

A glass substrate was used as the support.

The following coating liquid for forming an alignment film was applied to the support by spin coating. The support on which the coating film of the coating liquid for forming an alignment film was formed was dried using a hot plate at 60° C. for 60 seconds. As a result, an alignment film P-1 was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

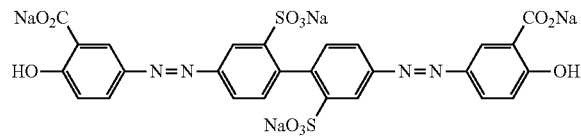

(Exposure of Alignment Film)

The alignment film was exposed using the exposure device shown in FIG. 8 to form an alignment film P-1 having an alignment pattern.

In the exposure device, a laser that emits laser light having a wavelength (325 nm) was used as the laser. The exposure amount of the interference light was 300 mJ/cm². The single period (the length over which the optical axis rotates by) 180° of an alignment pattern formed by interference of two laser beams was controlled by changing an intersecting angle (intersecting angle α) between the two beams.

<Preparation of Liquid Crystal Diffraction Element>

As the liquid crystal composition forming the liquid crystal diffraction element, the following composition G-1 was prepared. This composition G-1 is a liquid crystal composition forming a cholesteric liquid crystal layer (cholesteric liquid crystalline phase) that reflects right circularly polarized light.

Composition G-1

| | |
|---|---|
| Rod-Like liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 3.90 parts by mass |
| Chiral agent Ch-2 | 1.00 parts by mass |
| Methyl ethyl ketone | 203.00 parts by mass |

Rod-Like liquid crystal compound L-1

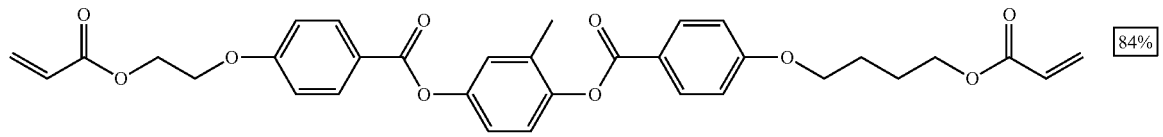 [SMILES: C=CC(=O)OCCCCOc1ccc(C(=O)Oc2ccc(OC(=O)c3ccc(OCCOC(=O)C=C)cc3)cc2C)cc1]

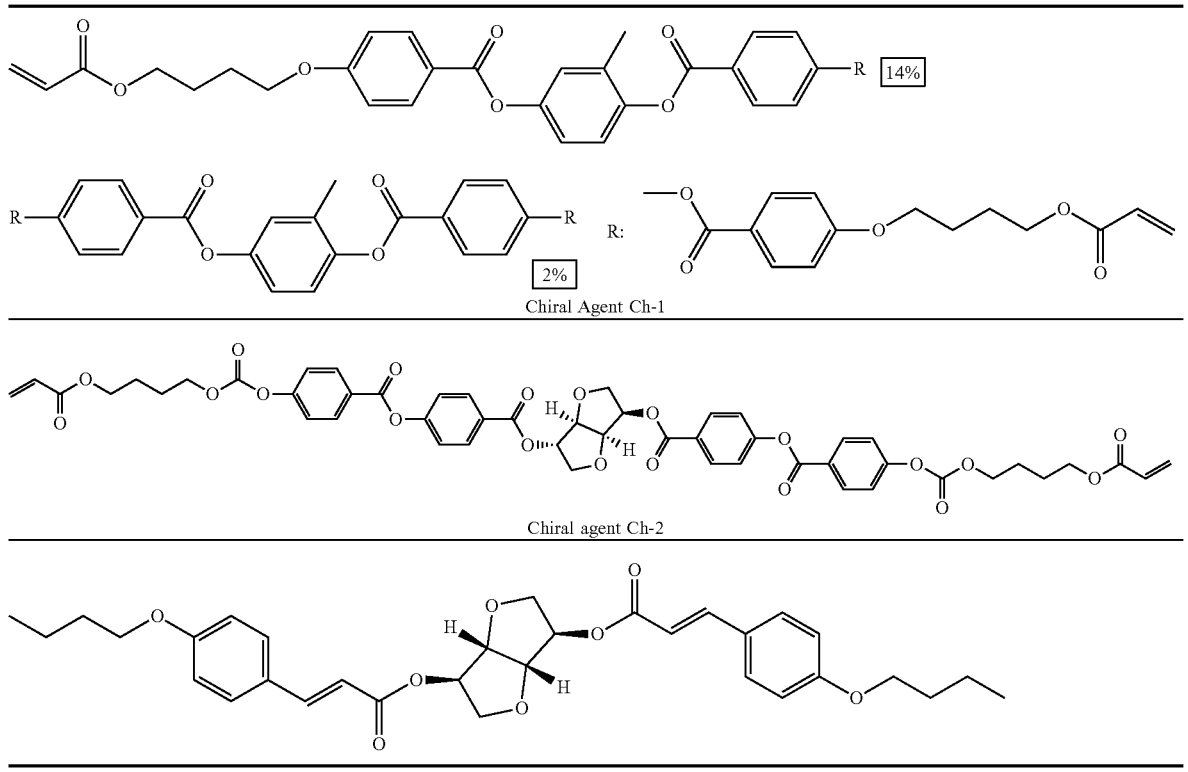

The above-described liquid crystal composition G-1 was applied to the alignment film P-1 using a spin coater.

The coating film of the liquid crystal composition G-1 was heated on a hot plate at 80° C. for 3 minutes (180 sec). Next, in a first exposure step, the coating film was exposed using a high-pressure mercury lamp at 80° C. in the air atmosphere through a long pass filter of 300 nm and a short pass filter of 350 nm. The first exposure step was performed such that the light irradiation dose measured at a wavelength of 315 nm was 10 mJ/cm². Further, the coating film was irradiated with ultraviolet light having a wavelength of 365 nm at 80° C. at an irradiation dose of 600 mJ/cm² using a high-pressure mercury lamp in a nitrogen atmosphere as the second exposure step. As a result, the liquid crystal composition G-1 was cured, the alignment of the liquid crystal compound was immobilized, and a cholesteric liquid crystal layer was formed.

Thus, a liquid crystal diffraction element including the support, the alignment film, and the cholesteric liquid crystal layer was prepared.

It was verified using a polarization microscope that the cholesteric liquid crystal layer had a periodically aligned surface as shown in FIG. 3. In the liquid crystal alignment pattern of the cholesteric liquid crystal layer, the single period over which the optical axis of the liquid crystal compound rotated by 180° was 0.42 μm.

In addition, the refractive index of the cholesteric liquid crystal layer was measured using an Abbe refractometer. As a result, the refractive index of the cholesteric liquid crystal layer was 1.6.

<Preparation of Light Guide Element>

As the first light guide layer, a glass plate having a refractive index of 1.5, a size of 60 mm×70 mm, and a thickness of 0.5 mm was prepared.

As the second light guide layer, a glass plate having a refractive index of 0.5, a size of 60 mm×70 mm, and a thickness of 0.5 mm was prepared.

The first light guide layer and the second light guide layer were completely laminated and were bonded to each other using a polyvinyl alcohol (manufactured by Kuraray Co., Ltd., PVA-117H) 3% aqueous solution as an adhesive to prepare a light guide plate.

In all of the following operation, the same adhesive was used.

The prepared liquid crystal diffraction element was cut in a circular shape having a diameter of 6 mm to prepare a G incidence diffraction element. Further, the prepared liquid crystal diffraction element was cut in a size of 20×25 mm to prepare a G emission diffraction element.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

The G incidence diffraction element was bonded using the adhesive to the vicinity of an end par of the light guide plate on the second light guide layer side in the longitudinal direction. In addition, the G emission diffraction element was bonded using the adhesive to a position of the light guide plate at a distance of 1 mm from the G incidence diffraction element on the second light guide layer side to prepare a light guide element.

The G incidence diffraction element was bonded such that a periodic direction of the diffraction element (the direction of the arrangement axis D) was adjusted to a direction in which diffracted light of light incident into the G incidence diffraction element propagated to the G emission diffraction element direction. In addition, the G emission diffraction element was bonded such that the periodic direction of the diffraction element (the direction of the arrangement axis D) was parallel to the periodic direction of the G incidence diffraction element and adjusted to a direction in which light diffracted by the G incidence diffraction element and propagated in the light guide plate was diffracted and emitted to the outside of the light guide plate.

Example 2

A light guide element was prepared using the same method as that of Example 1, except that the glass plate of the second light guide layer was changed to a glass plate having a refractive index of 1.7 to prepare a light guide plate.

Example 31

A light guide element was prepared using the same method as that of Example 1, except that the thickness of the first light guide layer was changed to 0.7 mm and the thickness of the second light guide layer was changed to 0.3 mm to prepare a light guide plate.

Example 41

A light guide element was prepared using the same method as that of Example 1, except that the glass plate of the second light guide layer was changed to a glass plate having a refractive index of 1.7, the thickness of the first light guide layer was changed to 0.7 mm, and the thickness of the second light guide layer was changed to 0.3 mm to prepare a light guide plate.

Example 5

<Preparation of Intermediate Diffraction Element>

An alignment film was formed on the support using the same method as that of the above-described liquid crystal diffraction element, except that the single period of the alignment pattern to be formed on the alignment film was changed by changing the intersecting angle (intersecting angle α) between two light components during the exposure of the alignment film by the exposure device shown in FIG. 8.

An intermediate diffraction element including the support, the alignment film, and the cholesteric liquid crystal layer was prepared using the same method as that of the liquid crystal diffraction element, except that the composition G-1 was applied to the alignment film.

In a case where the intermediate diffraction element was verified using the same method as that of the liquid crystal diffraction element, in the liquid crystal alignment pattern of the cholesteric liquid crystal layer, the single period over which the optical axis of the liquid crystal compound rotated by 180° was 0.3 μm, and the refractive index of the cholesteric liquid crystal layer was 1.6.

<Preparation of Light Guide Element>

The intermediate diffraction element was cut in a size of 15 (maximum)×25 mm to prepare a G intermediate diffraction element.

During the cutting of the G intermediate diffraction element, a cutting direction and a periodic direction of the diffraction structures were adjusted such that, in a case where the diffraction elements were disposed on the light guide plate, the periodic direction of the diffraction structure was a predetermined direction.

The same G incidence diffraction element and the same the G emission diffraction element as those of Example 1 and the formed G intermediate diffraction element were bonded to the same light guide plate as that of Example 1 in the arrangement shown in FIG. 14 to prepare a light guide element. All of The diffraction elements were bonded to the light guide plate on the second light guide layer side.

The light guide plate according to Example 1 was a laminate having a size of 60 mm×70 mm obtained by bonding a first light guide layer formed of glass and having a thickness of 0.5 mm and a refractive index of 1.5 and a second light guide layer having a thickness of 0.5 mm and a refractive index of 1.8 using the adhesive.

The G incidence diffraction element and the G intermediate diffraction element were disposed to be spaced from each other by 1 mm in the left-right direction (the longitudinal direction of the light guide plate). The G intermediate diffraction element and the G emission diffraction element were disposed to be spaced from each other by 8 mm in the up-down direction (the width direction of the light guide plate).

An angle between the periodic direction (the direction of the arrangement axis D) of the diffraction structure in the G incidence diffraction element and the periodic direction (the direction of the arrangement axis D) of the diffraction structure in the G emission diffraction element was 90°. In addition, both of an angle of the periodic direction of the diffraction structure in the G incidence diffraction element and an angle of the periodic direction of the diffraction structure in the G emission diffraction element with respect to a line perpendicular to the periodic direction (the direction of the arrangement axis D) of the diffraction structure in the G intermediate diffraction element were 45°.

Example 6

A light guide element was prepared using the same method as that of Example 5, except that the thickness of the first light guide layer was changed to 0.7 mm and the thickness of the second light guide layer was changed to 0.3 mm to prepare a light guide plate.

Comparative Example 1

A light guide element was prepared using the same method as that of Example 1, except that a glass plate having a thickness of 1 mm and a refractive index of 1.6 was used as the light guide plate.

[Evaluation]

Light having a wavelength of 532 nm was incident into the G incidence diffraction element of each of the prepared light guide elements at an incidence angle of 15°. The incidence angle of 15° refers to an angle of 15° with respect to the normal line.

Emitted light from the G emission diffraction element was projected to a screen to measure an interval of the emitted light.

The results are shown in the following Table 1.

TABLE 1

|  |  |  | Comparative example 1 | Example 1 | Example 2 | Example 3 | Example 4 | Example 5 | Example 6 |
|---|---|---|---|---|---|---|---|---|---|
| Diffraction Element | G Incidence Diffraction Element | Diffraction Structure Period [μm] | 0.42 | 0.42 | 0.42 | 0.42 | 0.42 | 0.42 | 0.42 |
|  |  | Liquid Crystal Layer Refractive Index | 1.6 | 1.6 | 1.6 | 1.6 | 1.6 | 1.6 | 1.6 |
|  | G Intermediate Diffraction Element | Diffraction Structure Period [μm] | — | — | — | — | — | 0.3 | 0.3 |
|  |  | Liquid Crystal Layer Refractive Index | — | — | — | — | — | 1.6 | 1.6 |
|  | G Emission Diffraction Element | Diffraction Structure Period [μm] | 0.42 | 0.42 | 0.42 | 0.42 | 0.42 | 0.42 | 0.42 |
|  |  | Liquid Crystal Layer Refractive Index | 1.6 | 1.6 | 1.6 | 1.6 | 1.6 | 1.6 | 1.6 |
| Light Guide Plate | First Light Guide Plate | Refractive Index | 1.6 | 1.5 | 1.5 | 1.5 | 1.5 | 1.5 | 1.5 |
|  |  | Thickness [mm] |  | 0.5 | 0.5 | 0.7 | 0.7 | 0.5 | 0.7 |
|  | Second Light Guide Plate | Refractive Index | — | 1.8 | 1.7 | 1.8 | 1.7 | 1.8 | 1.8 |
|  |  | Thickness [mm] | — | 0.5 | 0.5 | 0.3 | 0.3 | 0.5 | 0.3 |
|  | Thickness of Light Guide Plate [mm] |  | 1 | 1 | 1 | 1 | 1 | 1 | 1 |
| Evaluation | Emitted Light Interval [mm] |  | 6.3 | 1.6 | 2.0 | 1.0 | 1.2 | 1.6 | 1.0 |

As shown in Table 1, in the light guide element according to the embodiment of the present invention that includes the light guide plate consisting of the first light guide layer having a low refractive index and the second light guide layer having a high refractive index, as compared to Comparative Example 1 in which the thickness of the light guide plate is the same, the interval of emitted light can be significantly narrowed, that is, partial deterioration in image sharpness can be suppressed, and the entire image can be appropriately observed.

In addition, it was found from a comparison between Examples 1 and 3, Examples 2 and 4, and Examples 5 and 6 that, in a case where the second light guide layer having a high refractive index is thinner than the first light guide layer having a low refractive index, the interval of emitted light can be narrowed, and partial deterioration in image sharpness can be more suitably suppressed.

Further, it was found from a comparison between Examples 1 and 2 and a comparison between Examples 3 and 4 that, by increasing the difference in refractive index between the second light guide layer having a high refractive index and the first light guide layer having a low refractive index, the interval of emitted light can be narrowed, and partial deterioration in image sharpness can be more suitably suppressed.

As can be seen from the above results, the effects of the present invention are obvious.

The present invention is suitably applicable to a display device such as AR glasses including a light guide plate.

EXPLANATION OF REFERENCES

10, 50: light guide element
12, 12A, light guide plate
14: incidence diffraction unit
14R: R incidence diffraction element
14G: G incidence diffraction element
14B: B incidence diffraction element
16: emission diffraction unit
16R: R emission diffraction element
16G: G emission diffraction element
16B: B emission diffraction element
30: support
32: alignment film
34, 36: liquid crystal layer
40: liquid crystal compound
40A: optical axis
42: bright portion
44: dark portion
52: intermediate diffraction unit
60: exposure device
62: laser
64: light source
65: $\lambda/2$ plate
68: polarization beam splitter
70a, 70B: mirror
72A, 72B: $\lambda/4$ plate
$R_R$: right circularly polarized light
M: laser light
MA, MB: beam
$P_O$: linearly polarized light
$P_R$: right circularly polarized light
$P_L$: left circularly polarized light
$L_1, L_4$: incidence light
$L_2, L_5$: transmitted light
U: user
D: arrangement axis
A: single period (period of diffraction structure)
P: pitch

What is claimed is:

1. A light guide element comprising:
    a light guide plate that includes a first light guide layer and a second light guide layer; and
    an incidence diffraction element that is laminated on the second light guide layer of the light guide plate and an emission diffraction element that is laminated on the second light guide layer of the light guide plate,
    wherein in a case where a refractive index of the first light guide layer is represented by n1 and a refractive index of the second light guide layer is represented by n2 in the light guide plate,
    n1<n2 is satisfied; and wherein in a case where a thickness of the first light guide layer is represented by d1 and a thickness of the second light guide layer is represented by d2 in the light guide plate, d1≥d2 is satisfied.

2. The light guide element according to claim 1,
wherein a refractive index n1 of the first light guide layer and a refractive index n2 of the second light guide layer satisfy n2−n1>0.1.

3. The light guide element according to claim 1,
wherein in a case where a refractive index of the incidence diffraction element and the emission diffraction element is represented by nD, a refractive index n1 of the first light guide layer and the refractive index nD satisfy n1<nD.

4. The light guide element according to claim 1,
wherein in at least one of the incidence diffraction element or the emission diffraction element, a period of a diffraction structure is 0.1 to 10 μm.

5. The light guide element according to claim 1,
wherein an intermediate diffraction element is provided between the incidence diffraction element and the emission diffraction element on a light propagation path of the light guide plate.

6. An image display apparatus comprising:
the light guide element according to claim 1; and
a display element that emits an image to the incidence diffraction element.

7. The light guide element according to claim 1,
wherein a refractive index n1 of the first light guide layer and a refractive index n2 of the second light guide layer satisfy n2−n1>0.1.

8. The light guide element according to claim 1,
wherein a thickness d1 of the first light guide layer and a thickness d2 of the second light guide layer satisfy d2/d1<0.7.

9. The light guide element according to claim 1,
wherein in a case where a refractive index of the incidence diffraction element and the emission diffraction element is represented by nD, a refractive index n1 of the first light guide layer and the refractive index nD satisfy n1<nD.

10. The light guide element according to claim 1,
wherein at least one of the incidence diffraction element or the emission diffraction element is any one of a surface relief diffraction element, a volume hologram diffraction element, or a polarization diffraction element.

11. The light guide element according to claim 10,
wherein the polarization diffraction element includes a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

12. The light guide element according to claim 11,
wherein the liquid crystal diffraction layer has a region in which the direction of the optical axis of the liquid crystal compound is helically twisted and rotates in a thickness direction.

13. The light guide element according to claim 12,
wherein the liquid crystal diffraction layer includes a cholesteric liquid crystal layer obtained by immobilizing a cholesteric liquid crystalline phase.

14. The light guide element according to claim 1,
wherein in at least one of the incidence diffraction element or the emission diffraction element, a period of a diffraction structure is 0.1 to 10 μm.

15. A light guide element comprising:
a light guide plate that includes a first light guide layer and a second light guide layer; and
an incidence diffraction element that is laminated on the second light guide layer of the light guide plate and an emission diffraction element that is laminated on the second light guide layer of the light guide plate,
wherein in a case where a refractive index of the first light guide layer is represented by n1 and a refractive index of the second light guide layer is represented by n2 in the light guide plate,
n1<n2 is satisfied; and
wherein a thickness d1 of the first light guide layer and a thickness d2 of the second light guide layer satisfy d2/d1<0.7.

16. An image display apparatus comprising:
the light guide element according to claim 15; and
a display element that emits an image to the incidence diffraction element.

17. A light guide element comprising:
a light guide plate that includes a first light guide layer and a second light guide layer; and
an incidence diffraction element that is laminated on the second light guide layer of the light guide plate and an emission diffraction element that is laminated on the second light guide layer of the light guide plate,
wherein in a case where a refractive index of the first light guide layer is represented by n1 and a refractive index of the second light guide layer is represented by n2 in the light guide plate,
n1<n2 is satisfied;
wherein at least one of the incidence diffraction element or the emission diffraction element is any one of a surface relief diffraction element, a volume hologram diffraction element, or a polarization diffraction element; and
wherein the polarization diffraction element includes a liquid crystal diffraction layer that is formed of a composition including a liquid crystal compound and has a liquid crystal alignment pattern in which a direction of an optical axis derived from the liquid crystal compound changes while continuously rotating in at least one in-plane direction.

18. The light guide element according to claim 17,
wherein the liquid crystal diffraction layer has a region in which the direction of the optical axis of the liquid crystal compound is helically twisted and rotates in a thickness direction.

19. The light guide element according to claim 18,
wherein the liquid crystal diffraction layer includes a cholesteric liquid crystal layer obtained by immobilizing a cholesteric liquid crystalline phase.

20. An image display apparatus comprising:
the light guide element according to claim 17; and
a display element that emits an image to the incidence diffraction element.

* * * * *